(12) United States Patent
Gunji

(10) Patent No.: US 9,918,062 B2
(45) Date of Patent: Mar. 13, 2018

(54) IMAGE CAPTURING APPARATUS, CONTROL METHOD OF IMAGE CAPTURING APPARATUS, AND IMAGE PROCESSING METHOD

(71) Applicant: CANON KABUSHIKI KAISHA, Tokyo (JP)

(72) Inventor: Koichi Gunji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 14/708,695

(22) Filed: May 11, 2015

(65) Prior Publication Data

US 2015/0334296 A1 Nov. 19, 2015

(30) Foreign Application Priority Data

May 14, 2014 (JP) ................. 2014-100962

(51) Int. Cl.
| | |
|---|---|
| H04N 5/77 | (2006.01) |
| H04N 9/82 | (2006.01) |
| H04N 5/232 | (2006.01) |
| G11B 31/00 | (2006.01) |
| H04N 9/804 | (2006.01) |

(52) U.S. Cl.
CPC ......... *H04N 9/8205* (2013.01); *G11B 31/006* (2013.01); *H04N 5/23229* (2013.01); *H04N 5/23293* (2013.01); *H04N 5/772* (2013.01); *H04N 9/8047* (2013.01)

(58) Field of Classification Search
None
See application file for complete search history.

(56) References Cited

U.S. PATENT DOCUMENTS

2015/0304529 A1* 10/2015 Kawai ............... G02B 7/34
348/240.3
2017/0150094 A1* 5/2017 Miyamoto ............. H04N 5/917

FOREIGN PATENT DOCUMENTS

| JP | 2004-222148 A | 8/2004 |
|---|---|---|
| JP | 2011-244423 A | 12/2011 |

* cited by examiner

*Primary Examiner* — Heather Jones
(74) *Attorney, Agent, or Firm* — Cowan, Liebowitz & Latman, P.C.

(57) ABSTRACT

An image capturing apparatus which captures an image of a subject with an image sensor having pixels each including a plurality of areas and generates a RAW image for each of the plurality of areas from a signal generated by the image sensor. The apparatus generates a first RAW image and a second RAW image from the RAW images, generates first image data by performing first development on the first RAW image, generates first RAW image data and second RAW image data by compressing the first RAW image and the second RAW image and performs second development on the first RAW image having a higher processing load than the first development. Second image data is generated by the second development on the first RAW image by using the second RAW image.

21 Claims, 12 Drawing Sheets

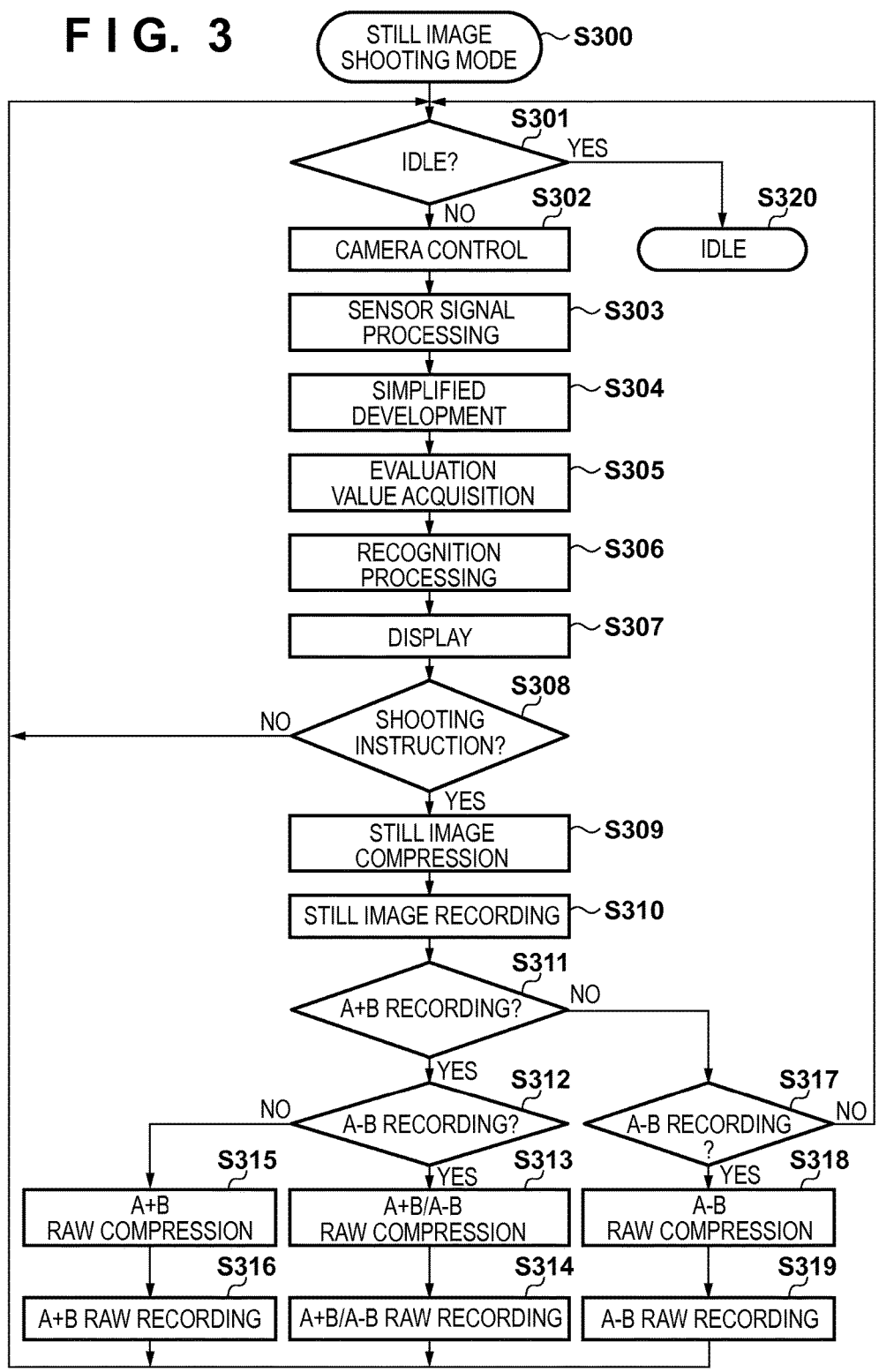

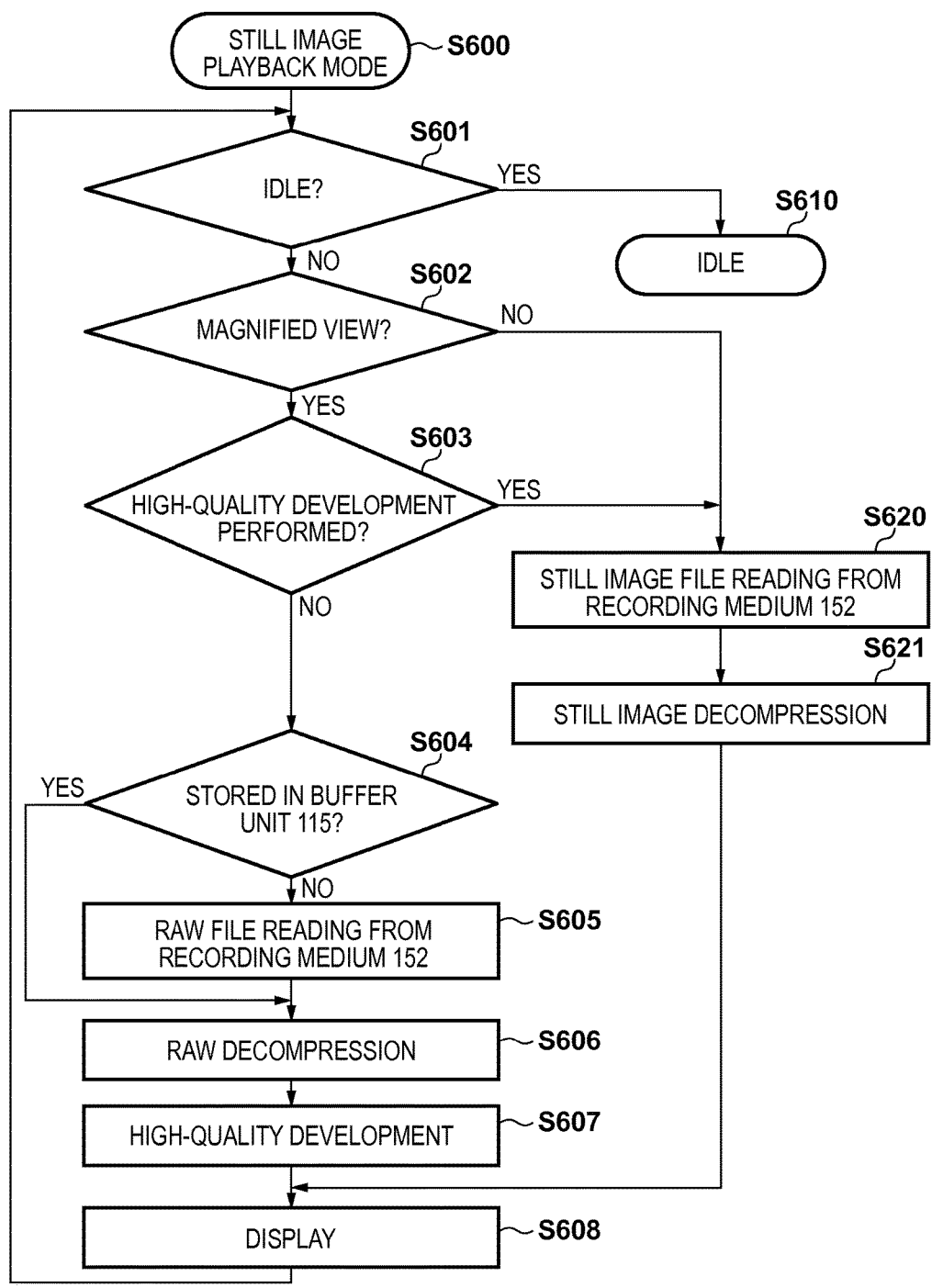

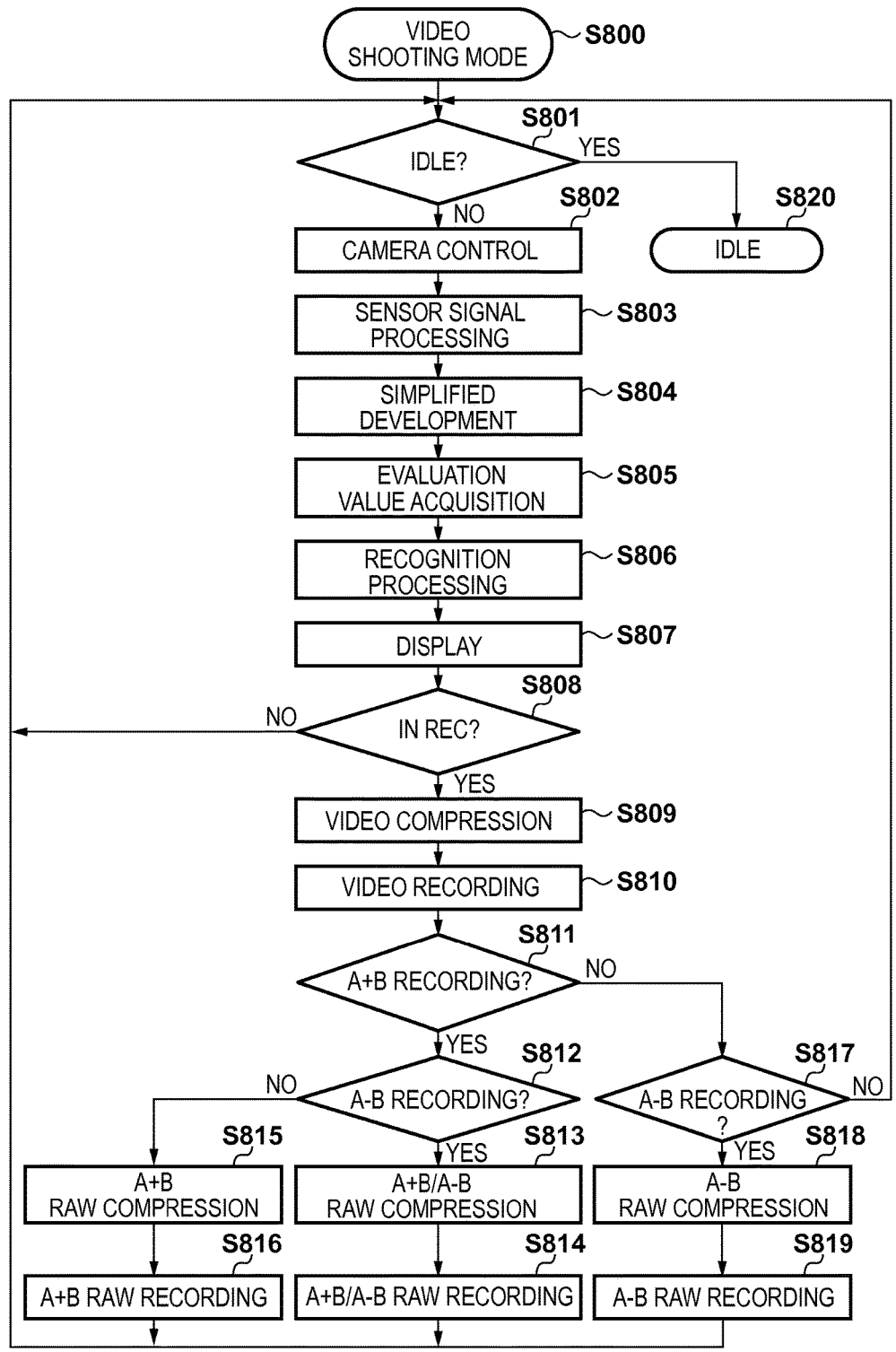

IMAGE CAPTURING APPARATUS, CONTROL METHOD OF IMAGE CAPTURING APPARATUS, AND IMAGE PROCESSING METHOD

BACKGROUND OF THE INVENTION

Field of the Invention

The present invention relates to an image capturing apparatus, a control method of an image capturing apparatus, and an image processing method.

Description of the Related Art

Conventional image capturing apparatuses transform raw image information (RAW image) captured by an image sensor into signals including luminance signals and color difference signals, and apply, to each signal, so-called development processing, which includes denoising, optical distortion correction, image optimization, etc. Usually, the luminance signals and color difference signals that have undergone the development processing are compression-coded and recorded on a recording medium.

Some image capturing apparatuses, however, are capable of recording RAW images. Although RAW images have a vast amount of data to be recorded, they have the advantage of not being altered or degraded from the original image, and being editable after shooting.

A configuration of an image capturing apparatus that records RAW images is disclosed in Japanese Patent Laid-Open No. 2011-244423. Japanese Patent Laid-Open No. 2011-244423 discloses a configuration for recording development parameters together with a RAW image, and then developing and playing back the RAW image by using the development parameters.

Also, Japanese Patent Laid-Open No. 2004-222148 discloses a configuration that is applicable to the case of a sensor that has pixels each including two photoelectric conversion areas (a high-sensitivity area and a low-sensitivity area), and according to this configuration, image data sets obtained from the high-sensitivity pixel and the low-sensitivity pixel are separately recorded as RAW data sets onto a recording medium. This configuration provides a recording method that realizes images that can be processed easily even in the case where image synthesis is performed outside the camera.

In addition, a sensor that has pixels each including two photoelectric conversion areas is also capable of obtaining data of two images that have a parallax, when the two areas are configured to have a same sensitivity. It is also possible to calculate the image defocus amount by detecting the relative positions of the subject captured in the two images, and to perform image processing such as focus readjustment (refocusing) according to the defocus amount.

Image capturing apparatuses in recent years have an advanced image sensor, and the number of pixels in one image is increasing. The number of successive images that can be taken per second is also increasing. For these reasons, the amount of processing involved in RAW image development processing, such as debayering, denoising, and optical distortion correction, is accordingly increasing, and, in some cases, development processing performed in parallel with shooting requires an extremely large proportion of the ability of the circuitry or a large amount of power consumption. It can also happen that the performance of shooting is degraded by development processing occupying the circuitry or imposing a limitation in terms of power consumption, for example.

On the other hand, a configuration for recording RAW images without developing them, as with the configuration disclosed in Japanese Patent Laid-Open No. 2011-244423 described above, can reduce the amount of processing for development during shooting. However, since images are recorded in an undeveloped state, it is difficult to promptly play back and display the images, for example. Furthermore, it is possible that RAW images cannot be played back (or developed) by other devices. Therefore, conventional methods of recording RAW images sometimes cause inconvenience to users.

In addition, in the case of a configuration for recording RAW images without developing them as with the configuration disclosed in Japanese Patent Laid-Open No. 2011-244423 described above, dynamic range adjustment or the likes are sometimes performed during developing and editing after shooting, by using the image information acquired from high-sensitivity pixels and low-sensitivity pixels as disclosed in Japanese Patent Laid-Open No. 2004-222148 described above. However, there are cases where users wish to perform a focus adjustment based on image phase information acquired from the pixels. In such cases, information of each of the pixels is desired to be recorded on a recording medium. For this purpose, Japanese Patent Laid-Open No. 2004-222148 described above proposes a method of recording image data sets as separate RAW data sets onto a recording medium. However, this method increases the amount of recording data and reduces the available storage capacity, and sometimes causes inconvenience to users.

As described above, in order to realize high shooting performance, high recording performance, and high-speed playback of images by using a conventional apparatus, the apparatus is required to be equipped with high-performance circuitry and to perform high-output driving in some cases. Such a conventional apparatus is also required to be equipped with a large-capacity recording medium for recording RAW images, and to perform high-speed playback in a simple manner in some cases.

SUMMARY OF THE INVENTION

In view of the above, the present invention provides an image capturing apparatus using a sensor, configured to perform simplified development that involves only a small amount of processing, thereby preparing images that can be played back easily, and at the same time, the present invention enables the image capturing apparatus to perform high-quality development processing from RAW images, thus reducing the amount of recording data.

According to some embodiments of the invention, an image capturing apparatus is provided. The apparatus comprises, an image capturing unit configured to capture an image of a subject by using an image sensor having pixels each including a plurality of areas, and to generate a RAW image for each of the plurality of areas from a signal generated by the image sensor, a generating unit configured to generate a first RAW image and a second RAW image from the RAW images each generated for each of the plurality of areas, a first development unit configured to generate first image data by performing development processing on the first RAW image, a RAW compressing unit configured to generate first RAW image data and second RAW image data by compressing the first RAW image and the second RAW image, and a second development unit configured to perform development processing on the first RAW image, the development processing performed by the second development unit having a higher processing load than the development processing performed by the first development unit, wherein the second development unit generates second image data by performing development processing on the first RAW image by using the second RAW image.

Further features of the present invention will become apparent from the following description of exemplary embodiments (with reference to the attached drawings).

BRIEF DESCRIPTION OF THE DRAWINGS

FIG. 3 is a flowchart relating to processing performed in a still image shooting mode according to the embodiment of the invention.

FIG. 6 is a flowchart relating to processing performed in a still image playback mode according to the embodiment of the invention.

FIG. 8 is a flowchart relating to processing performed in a video shooting mode according to the embodiment of the invention.

DESCRIPTION OF THE EMBODIMENTS

Figure 1:
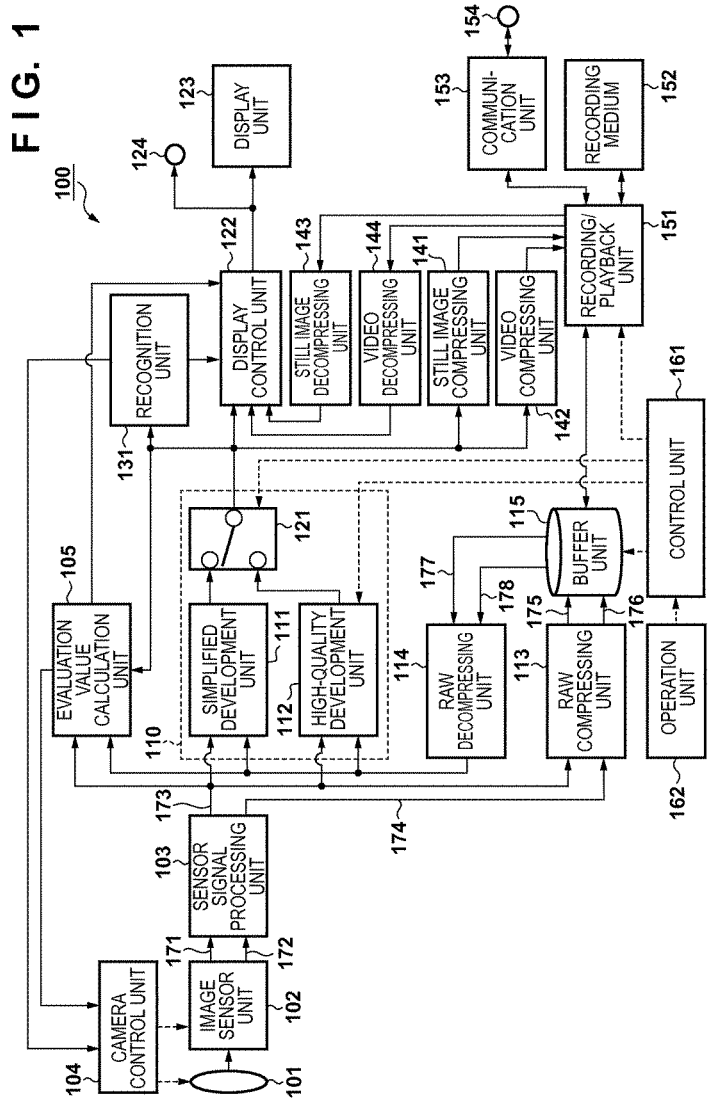
FIG. 1 is a block diagram showing an example of a configuration of an image capturing apparatus according to an embodiment of the invention.

The following provides a detailed description of an embodiment of the present invention. FIG. 1 is a block diagram showing an example of the configuration of an image capturing apparatus according to the embodiment of the present invention. An image capturing apparatus 100 shown in FIG. 1 not only records image information obtained by shooting a subject onto a recording medium, but also has the function of playing back the image information from the recording medium and displaying the image by performing development processing as well as the function of exchanging image information with an external apparatus, a server (cloud), etc. Therefore, an image capturing apparatus according to the embodiment of the invention may also be referred to as an image processing apparatus, a recording apparatus, a playback apparatus, a recording/playback apparatus, a communication apparatus, etc.

In the image capturing apparatus 100 shown in FIG. 1, each block other than physical devices such as an image sensor, a display element, an input device, and a terminal may be configured as hardware using dedicated logic circuitry or a memory. Alternatively, each block may be configured as software implemented by a computer such as a CPU executing a processing program stored in a memory. In addition, the image capturing apparatus 100 may be configured as any sort of information processing terminal or image capturing apparatus other than a digital camera, such as a personal computer, a mobile telephone, a smartphone, a PDA, a tablet terminal, or a digital video camera.

In FIG. 1, a control unit 161 includes a CPU and a memory that stores a control program to be executed by the CPU, and controls the entire operation of the image capturing apparatus 100. An operation unit 162 includes an input device used by a user to input an instruction to the image capturing apparatus 100, such as a key, a button, and a touch panel. An operation signal from the operation unit 162 is detected by the control unit 161, and is controlled by the control unit 161 so that the image capturing apparatus 100 operates according to the operation signal. A display unit 123 includes, for example, a liquid crystal display (LCD) for displaying an image captured or played back by the image capturing apparatus 100, a menu screen, various sorts of information, etc.

When an instruction to start a shooting operation is given by the operation unit 162, an optical image of the shooting subject is input via an imaging optical unit 101, and forms an image on an image sensor unit 102. During the shooting, operations of the imaging optical unit 101 and the image sensor unit 102 are controlled by a camera control unit 104 based on the results of evaluation value calculation with respect to the aperture, focus, blurring associated with camera shake, etc., obtained by an evaluation value calculation unit 105, and subject information extracted by a recognition unit 131.

Figure 11A:
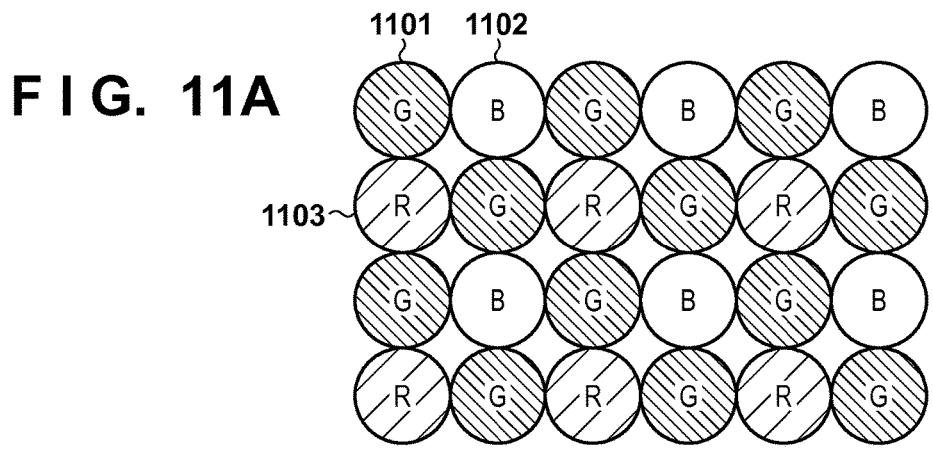
FIGS. 11A to 11C are diagrams illustrating examples of a pixel arrangement and a configuration of a sensor according to the embodiment of the invention.
Figure 11B:
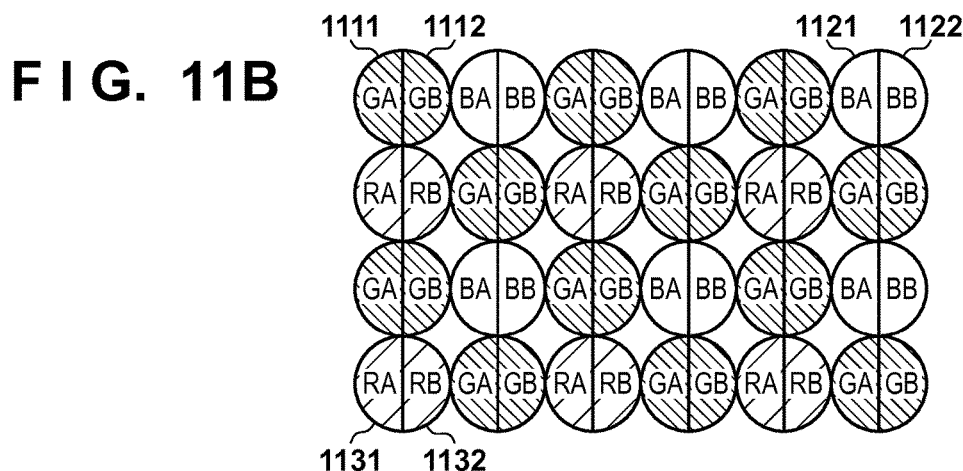

The image sensor unit 102 includes an image sensor such as a CCD or CMOS sensor, and transforms the light passing through red, green, and blue (RGB) color filters provided for each pixel, into electrical signals. FIGS. 11A and 11B are examples of color filters provided in the image sensor unit 102, and show a pixel arrangement in an image treated by the image capturing apparatus 100. As shown in FIGS. 11A and 11B, red (R), green (G), and blue (B) colors, one color for one pixel, are arranged in a mosaic pattern. Every four (2×2) pixels constitute a group, which is composed of one red pixel, one blue pixel, and two green pixels, and such groups are arranged in a regular manner. Such an arrangement is commonly called Bayer arrangement.

Note that FIG. 11A shows the case where each pixel has one area (green pixel 1101, blue pixel 1102 and red pixel 1103), and FIG. 11B shows the case where each pixel has two areas (A-area and B-area) such as green pixels 1111 and 1112, blue pixels 1121 and 1122, and red pixels 1131 and 1132. The present embodiment describes the case where the image sensor having the configuration shown in FIG. 11B is adopted.

Figure 11C:
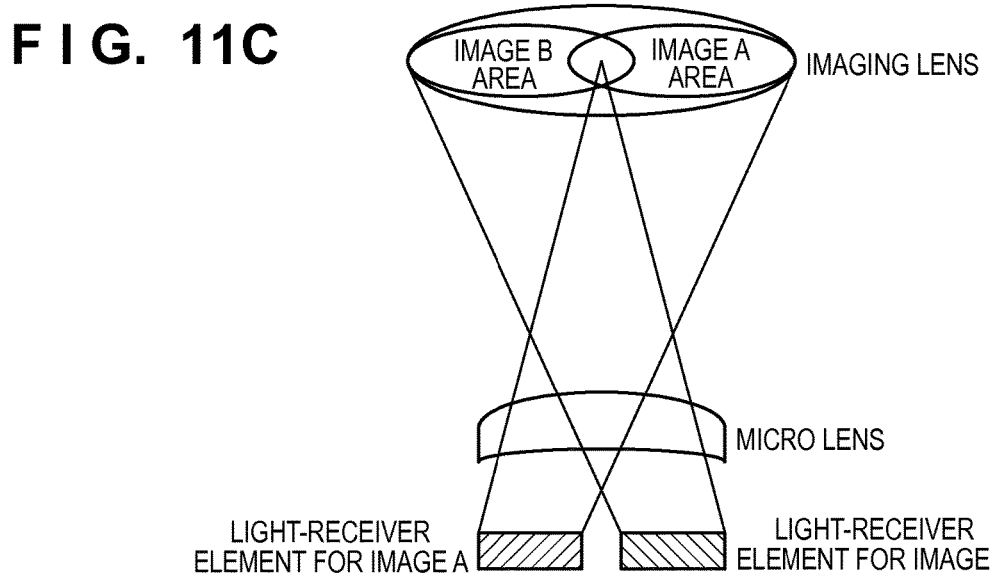

FIG. 11C shows an example of the configuration of the image sensor unit 102 in which an image sensor having the configuration shown in FIG. 11B is adopted. A light-receiver element for image A receives the light passing through the image A area of an imaging lens, and a light-receiver element for image B receives the light passing through the image B area of the imaging lens. The image A and the image B from the same imaging lens are received by the pixels via a single micro lens, so that two image signals having a parallax can be obtained.

Regarding the electrical signals resulting from the transformation performed by the image sensor unit 102, image information obtained from A-areas and image information obtained from B-areas shown in FIG. 11B, which are represented by signals 171 and 172, are separately input to the sensor signal processing unit 103 and undergo pixel value restoration. The pixel value restoration includes processing for interpolating the values of missing pixels or unreliable pixels of the image sensor unit 102 by using the values of neighboring pixels, and processing for subtracting a predetermined offset value from the values of missing pixels or unreliable pixels. In the present embodiment, the image information obtained by applying predetermined correction processing, etc. to the image information output by the sensor signal processing unit 103 is referred to as an RAW image, which means a raw (undeveloped) image. The predetermined correction processing applied to the image information in the present embodiment includes restoration, color balance correction, predetermined file size reduction, etc.

The signal 173 shown in FIG. 1 represents addition information (an addition RAW image) resulting from the addition of the image information obtained from the A-areas and the image information obtained from the B-areas shown in FIG. 11B. The signal 174 shown in FIG. 1 represents subtraction information (a difference RAW image) resulting from a subtraction performed with respect to the image information obtained from the A-areas and the image information obtained from the B-areas. The amount of the information of the addition RAW image is greater than the amount of the image information of the A-areas or the B-areas by one bit, whereas the amount of the information of the difference RAW image is smaller than the amount of the image information of the A-areas or the B-areas by several bits. Therefore, this configuration can reduce the data amount, compared to the case of simply storing two RAW images.

RAW images undergo development processing performed by the development unit 110. The development unit 110 has a plurality of different development units, and is configured to include a simplified development unit 111 as a first development unit, a high-quality development unit 112 as a second development unit, and a switch 121 that selects either one of the outputs therefrom. Both the simplified development unit 111 and the high-quality development unit 112 perform debayering (demosaicing) on a RAW image to transform it to signals including luminance signals and color difference signals, and apply, to each signal, so-called development processing, which includes denoising, optical distortion correction, image optimization, etc.

In particular, the high-quality development unit 112 performs each sort of processing with a higher accuracy than the simplified development unit 111. Due to the high accuracy, the image quality of the developed image is higher than when the simplified development unit 111 is used. On the other hand, the processing load is greater. The high-quality development unit 112 of the present embodiment therefore does not dedicate to real-time development processing in parallel with shooting, and is configured to perform distributed processing, taking certain time after the shooting. By performing the high-quality development processing by taking certain time after the shooting instead of performing it during the shooting, it is possible to reduce the circuit size and the increase (peak) of the power consumption. On the other hand, the simplified development unit 111 can only achieve a lower image quality than the high-quality development unit 112, but is configured to reduce the amount of the processing related to the development, compared to the high-quality development processing, so that the development processing can be performed at a high speed during the shooting. Since the processing load of the simplified development unit 111 is low, the simplified development unit 111 is used when real-time developing is performed in parallel with the operation for shooting. The switch 121 is switched by the control unit 161 according to an operational instruction input by the user from the operation unit 162 and to control corresponding to the operation mode that is being executed.

In the present embodiment, the simplified development unit 111 and the high-quality development unit 112 independently exist in the development unit 110. However, a configuration in which a single development unit performs either simplified development processing or high-quality development processing while switching between operation modes is also included in the scope of the present invention. The image information that has undergone the development processing performed by the development unit 110 further undergoes predetermined display processing performed by a display control unit 122, and is then displayed by the display unit 123. The image information that has undergone the development processing may be output to an externally-connected display device by a video output terminal 124. The video output terminal 124 includes a general-purpose interface such as HDMI or SDI.

The image information that has undergone the development processing performed by the development unit 110 is also supplied to the evaluation value calculation unit 105. The evaluation value calculation unit 105 calculates evaluation values with respect to the focus state, the exposure state, etc. from the image information.

The image information that has undergone the development processing performed by the development unit 110 is also supplied to the recognition unit 131. The recognition unit 131 has the function of detecting and recognizing the subject information included in the image information. For example, the recognition unit 131 detects a human face within an image represented by the image information, and outputs positional information of a human face, if any, and furthermore, recognizes a particular human based on feature information of the face or the like.

The image information that has undergone the development processing performed by the development unit 110 is also supplied to a still image compressing unit 141 and a video compressing unit 142. The still image compressing unit 141 is used when the image information is to be compressed in the form of a still image. The video compressing unit 142 is used when the image information is compressed in the form of a video. Each of the still image compressing unit 141 and the video compressing unit 142 performs high-efficiency encoding (compression encoding) on the subject image information, in order to generate image information with a reduced amount of information, and transforms the image information into an image file (a still image file or a video file). A compression method applicable to a still image is JPEG, etc., and a compression method applicable to a video is MPEG-2, H.264, H.265, etc.

A RAW compressing unit 113 performs high-efficiency encoding using technology such as wavelet transformation or delta encoding on each of the addition RAW image and the difference RAW image output by the sensor signal processing unit 103. Then, the addition RAW image and the difference RAW image are transformed into compressed addition RAW image data and compressed difference RAW image data, and are stored in a buffer unit (temporary memory) 115. Although the RAW image data can be left in the buffer unit 115 and be read again, the RAW image data stored in the buffer unit 115 may be transferred to and stored on another recording medium (i.e. may be deleted from the buffer unit 115).

The RAW files including the RAW image data, and the above-described still image file and the video file, are recorded by a recording/playback unit 151 onto a recording medium 152. The recording medium 152 is, for example, a built-in large capacity memory or hard disk, a detachable memory card, etc. The recording/playback unit 151 is also capable of reading the still image file, the video file, and the RAW files from the recording medium 152.

The recording/playback unit 151 is capable of writing or reading various files into/from an external storage or server via a communication unit 153. The communication unit 153 is configured to be capable of accessing the Internet or an external device by using a communication terminal 154 via wireless communication or wired communication.

When playback operation is started, the recording/playback unit 151 acquires and plays back a desired file from the recording medium 152 or via the communication unit 153. When the playback-target file is a RAW file, the recording/playback unit 151 stores the RAW image data stored in the acquired RAW file into the buffer unit 115. When the playback-target file is a still image file, the recording/playback unit 151 provides the still image data stored in the acquired still image file to a still image decompressing unit 143. When the playback-target file is a video file, the recording/playback unit 151 provides the video data stored in the acquired video file to a video decompressing unit 144.

A RAW decompressing unit 114 reads the RAW image data stored in the buffer unit 115, and decodes the compressed RAW image data to generate a RAW image. The RAW image obtained by decompression of the RAW image data performed by the RAW decompressing unit 114 is supplied to the simplified development unit 111 and the high-quality development unit 112 included in the development unit 110.

The still image decompressing unit 143 decodes and thereby decompresses the input still image data to generate a still playback image, and provides the still playback image to the display control unit 122. The video decompressing unit 144 decodes and thereby decompresses the input video data to generate playback images of a video (playback video), and provides the playback video to the display control unit 122.

Figure 2:
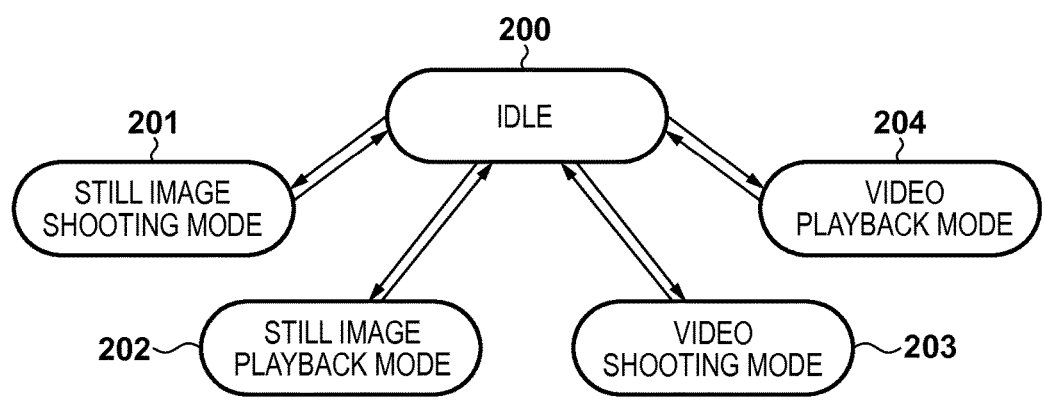
FIG. 2 is a state transition diagram according to the embodiment of the invention.

Next, a description is given to operation modes of the image capturing apparatus 100 according to the present embodiment, with reference to drawings. FIG. 2 is a state transition diagram showing transition between operation modes of the image capturing apparatus 100. Such mode transition is performed according to the user's operational instruction from the operation unit 162 or a determination made by the control unit 161, and may be caused manually according to the operation, or occur automatically. As shown in FIG. 2, the image capturing apparatus 100 operates while switching to an appropriate mode among four modes via the idle state (200). The four modes are, namely, the still image shooting mode (201), the still image playback mode (202), the video shooting mode (203), and the video playback mode (204).

Next, a description is given to operation of the image capturing apparatus 100 in the still image shooting mode.

FIG. 3 shows a flowchart relating to processing performed in the still image shooting mode according to the present embodiment. The flowchart shown in FIG. 3 illustrates the processing procedure performed by the control unit 161 while controlling each processing block. A program stored in a memory (ROM) of the control unit 161 is written into a memory (RAM), and a CPU executes the program, thereby executing the procedure.

In FIG. 3, when operation in the still image shooting mode is started, the control unit 161, at S301, determines whether the processing load on the image capturing apparatus 100 is low or not. When the processing load is low, transition to the idle state occurs as indicated by S320, and otherwise the processing advances to S302. The occurrence frequency of the transition depends on the processing load. For example, during a continuous high-speed shooting, the processing always advances to S302 instead of advancing to S320, because the processing load is high. In the case of a usual one-shot image capturing, the processing advances to S320 during the first shooting and the second shooting, for example at a half the occurrence frequency.

At S302, the camera control unit 104 controls the operation of the imaging optical unit 101 and the image sensor unit 102 so as to perform shooting. For example, a lens included in the imaging optical unit 101 is moved according to a user instruction for zooming and focusing, and the reading area of the image sensor unit 102 is determined according to an instruction indicating the number of pixels used for the shooting. Also, a focus adjustment and a focus tracking with respect to a particular subject is controlled based on evaluation value information and subject information provided from the evaluation value calculation unit 105 and the recognition unit 131 as described below.

At S303, the sensor signal processing unit 103 performs signal processing on the electrical signals resulting from the transformation performed by the image sensor unit 102, in order to restore the pixel values. The processing performed here includes processing for interpolating the values of defective pixels or unreliable pixels by using the values of neighboring pixels, and processing for subtracting a predetermined offset value from the values of defective pixels or unreliable pixels. In the present embodiment, the image information output from the sensor signal processing unit 103 after the processing performed at S303 is referred to as a RAW image, which means a raw (undeveloped) image. In the present embodiment, the sensor signal processing unit 103 outputs an addition RAW image 173 and a difference RAW image 174. The addition RAW image 173 is addition information resulting from the addition performed with respect to the image information obtained from the A-areas and the image information obtained from the B-areas shown in FIG. 11B. The difference RAW image 174 is subtraction information resulting from the subtraction performed with respect to the image information obtained from the A-areas and the image information obtained from the B-areas.

At S304, the simplified development unit 111 develops the addition RAW image 173. At this moment, the control unit 161 causes the switch 121 included in the development unit 110 to output the image information that has undergone the development processing performed by the simplified development unit 111. The simplified development unit 111 performs debayering (demosaicing) on the addition RAW image 173 to transform it to signals including luminance signals and color difference signals, and applies, to each signal, so-called development processing, which includes denoising, optical distortion correction, image optimization, etc. Here, a description is given to the development processing (simplified development) performed by the simplified development unit 111.

The simplified development unit 111 achieves high-speed or simplified development processing by limiting the image size after the development processing to two million pixels or less, limiting the denoising or the optical distortion correction to particular processing, or omitting the denoising or the optical distortion correction. Since the simplified development unit 111 performs the processing after reducing the image size or partially limits the functions of the development processing, the image capturing apparatus 100 can perform high-performance shooting, such as shooting with two million pixels at the rate of 60 frames per second, with a small circuit size and a low power consumption.

The image information that has undergone the development processing performed by the simplified development unit 111 is supplied to the evaluation value calculation unit 105. At S305, the evaluation value calculation unit 105 calculates evaluation values with respect to the focus state, the exposure state, etc. from luminance values and contrast values included in the image information. Note that the evaluation value calculation unit 105 may acquire the RAW image before the development processing and calculate evaluation values from the RAW image in the same manner. The image information that has undergone the development processing performed by the simplified development unit 111 is supplied to the recognition unit 131. At S306, the recognition unit 131 detects the subject (e.g., a human face) from the image information, and recognizes the subject information. For example, the recognition unit 131 determines the presence or the absence of a human face in the image information, detects the position thereof, performs recognition of a particular human, and outputs information indicating the result.

The image information that has undergone the development processing performed by the simplified development unit 111 is also supplied to the display control unit 122. At S307, the display control unit 122 forms a display image from the acquired image information, and outputs the image to the display unit 123 or an external display apparatus to display the image. The display image formed by the display unit 123 is used for live-view display (shooting through-image display) in the still image shooting mode, by which the user can appropriately frame the subject. Note that the display image may be output from the display control unit 122 to another display apparatus such as an external television via the video output terminal 124. Furthermore, the display control unit 122 is also capable of, for example, displaying a mark on the focus area of the display image or displaying a frame around the recognized human face, by using the evaluation value information or the subject information provided from the evaluation value calculation unit 105 and the recognition unit 131.

At S308, the control unit 161 detects a shooting instruction (image capturing instruction) from the user, and the processing advances to S309 when the shooting instruction is detected. At S308, when there is no shooting instruction, the processing returns to S301, and the preparation operation for shooting and the live-view display are repeatedly performed. In response to the shooting instruction at S308, the image information that has undergone the development processing performed by the simplified development unit 111 is supplied to the still image compressing unit 141. The still image compressing unit 141 performs high-efficiency encoding (still image compression) on the acquired image information (S309), and generates a still image file including the still image data. Note that the still image compressing unit 141 performs the compression processing by using a known still image compression technology such as JPEG.

At S310, the recording/playback unit 151 records the still image file onto the recording medium 152. Furthermore, in response to the shooting instruction at S308, a determination is made at S311 and S312 as to whether or not to record the addition RAW file and the difference RAW file. If it is determined at S311 to record the addition RAW file, the processing advances to S312 and a determination is made as to whether or not to record the difference RAW file. If it is determined to record the difference RAW file, the processing advances to S313. On the other hand, if it is determined not to record the difference RAW file, the processing advances to S315. Meanwhile, when it is determined not to record the addition RAW file, the processing advances to S317 and a determination is made as to whether or not to record the difference RAW file. If it is determined to record the difference RAW file, the processing advances to S318. If it is determined not to record the difference RAW file, i.e., if it is determined not to record the addition RAW file or the difference RAW file, the processing returns to S301.

At S313, the RAW compressing unit 113 acquires the addition RAW image and the difference RAW image corresponding to the captured still image and being output from the sensor signal processing unit 103, and performs high-efficiency encoding (RAW compression) on each image. The addition RAW image data and the difference RAW image data obtained by the RAW compression are each stored into the buffer unit 115. The high-efficiency encoding performed by the RAW compressing unit 113 uses a known technology such as wavelet transformation or delta encoding, and may be lossy compression or lossless compression. Alternatively, the RAW compression by the RAW compressing unit 113 may be omitted, and the RAW image in the uncompressed state may be output as it is. Regardless of whether or not the RAW compression is performed, the RAW image data generated in the present embodiment is data that retains the most of the image information provided from the sensor signal processing unit 103 and that can be reconstructed as a high quality image. After the recording/playback unit 151 records the RAW files onto the recording medium 152 at S314, the processing advances to S301. Note that, at S311 and S314, the recording/playback unit 151 may transfer the still image file and/or the RAW file to an external storage from the communication terminal 154 via the communication unit 153 so that the files are recorded on the external storage.

At each of S315 and S318, in the same manner as the processing performed at S313, the RAW compressing unit 113 acquires the addition RAW image or the difference RAW image each corresponding to the captured still image and being output from the sensor signal processing unit 103. Then, the RAW compressing unit 113 performs the high-efficiency encoding on each image, thereby transforming the image into the addition RAW image data or the difference RAW image data.

Subsequently, at S316 and S319, the recording/playback unit 151 records the RAW file including the RAW image data generated in the previous step onto the recording medium 152, and then the processing advances to S301. This concludes the description of the flow of the operation performed in the still image shooting mode according to the present embodiment.

Figure 4A:
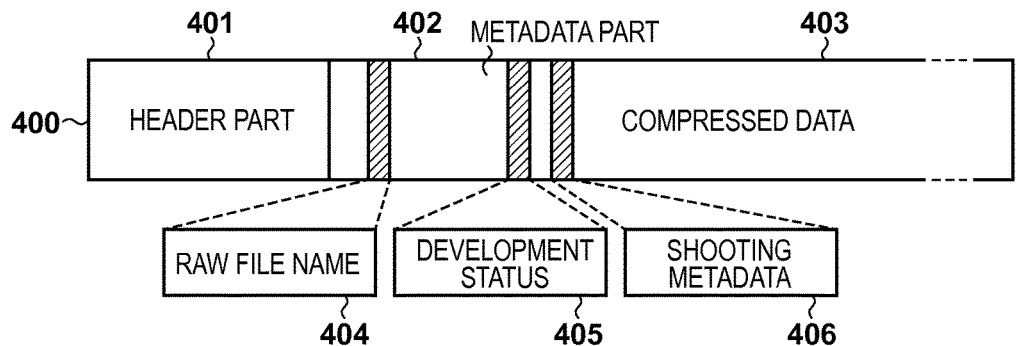
FIGS. 4A to 4C are diagrams showing an example of configurations of a still image file and RAW files according to the embodiment of the invention.
Figure 4B:
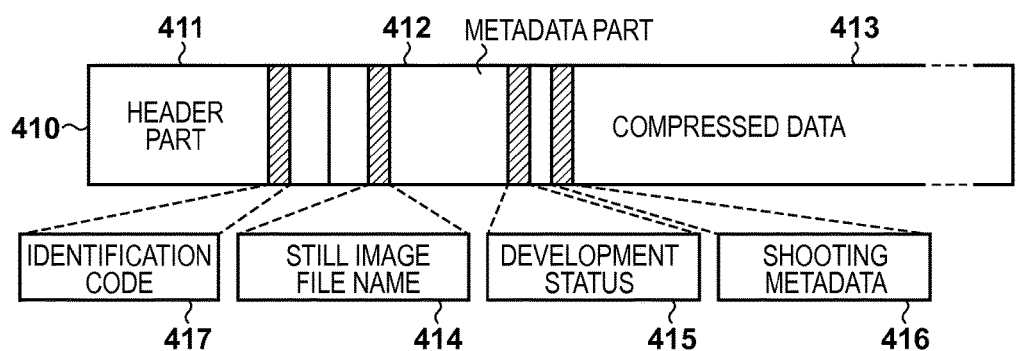
Figure 4C:
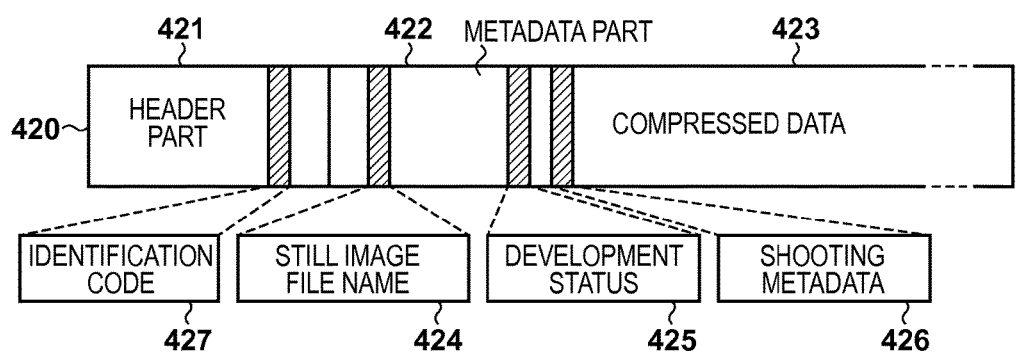

Here, a description is given to the configuration of the still image file and the configurations of the RAW files according to the present embodiment. FIGS. 4A to 4C are diagrams showing an example of the configurations of a still image file and RAW files.

A still image file 400 shown in FIG. 4A is recorded by the recording/playback unit 151 in, for example, a predetermined recording area of the recording medium 152. The still image file 400 includes a header part 401, a metadata part 402, and a compressed data part 403. The header part 401 includes, for example, an identification code indicating that this file is in the format of a still image file. The compressed data part 403 includes compressed still image data that has undergone the high-efficiency encoding.

The metadata part 402 includes file name information 404 indicating the file name of the RAW file including the RAW image data corresponding to the still image data stored in this still image file. The metadata part 402 may also include development status information 405, which includes a flag indicating whether this still image file includes image data generated by the simplified development processing performed by the simplified development unit 111 or image data generated by the high-quality development processing performed by the high-quality development unit 112. The metadata part 402 also includes shooting metadata 406, which includes the evaluation values and the subject information obtained by the evaluation value calculation unit 105 and the recognition unit 131, and information about the condition of the shooting (e.g., lens type identification information and sensor type identification information) obtained from the imaging optical unit 101 and the image sensor unit 102. In addition, although not shown in the drawing, the metadata part 402 may also include an identification code identifying the recording medium on which the corresponding RAW file is recorded, and path information specifying the location of the folder in which the RAW file is recorded.

The RAW file 410 shown in FIG. 4B and the RAW file 420 shown in FIG. 4C are either stored in the buffer unit 115 or recorded by the recording/playback unit 151 on, for example, a predetermined recording area of the recording medium 152. Note that when the RAW image data is stored in the buffer unit 115, it is not necessary that the pieces of data are stored in the form of files arranged in the order shown in FIGS. 4B and 4C. Also note that information of the RAW image data, the header part, and the metadata part may be retained in the buffer unit 115 even after being recorded onto the recording medium 152. Each of the RAW files 410 and 420 includes a header part 411 (421), a metadata part 412 (422), and a compressed data part 413 (423). The header part 411 (421) includes, for example, an identification code 417 (427) indicating that this file is in the format of an addition RAW file or a difference RAW file. The compressed data part 413 (423) includes RAW image data that has undergone the high-efficiency encoding (the RAW image may be in an uncompressed form).

The metadata part 412 (422) includes file name information 414 (424) indicating the file name of the still image file including the still image data generated by performing the development processing on the RAW image data included in this RAW file. The metadata part 412 (422) may also include development status information 415 (425), which includes a flag indicating whether the still image data included in the still image file has been generated by the simplified development processing performed by the simplified development unit 111 or by the high-quality development processing performed by the high-quality development unit 112. The metadata part 412 (422) also includes shooting metadata 416 (426), which includes the evaluation values and the subject information obtained by the evaluation value calculation unit 105 and the recognition unit 131, and information about the condition of the shooting (e.g., lens type identification information and sensor type identification information) obtained from the imaging optical unit 101 and the image sensor unit 102. In addition, although not shown in the drawing, the metadata part 412 (422) may also include an identification code identifying the recording medium on which the corresponding still image file is recorded, and path information specifying the location of the folder in which the still image file is recorded. Alternatively, the corresponding still image file per se may be transformed into metadata and stored in the metadata part 412 (422). The configurations of the above-described files according to the present embodiment are merely examples, and they may have a configuration conforming to a standard such as DCF or EXIF.

Note that, in FIG. 1 according to the present embodiment described above, the combinations of the signal 171 obtained from the A-areas and the signal 172 obtained from the B-areas, the addition RAW image 173 and the difference RAW image 174, and the addition RAW file 175 and the difference RAW file 176, are merely examples. In other words, in the case of the image sensor shown in FIG. 11A, it is possible to transmit the image information by using the signal 171 obtained from the A-areas, the addition RAW image 173, and the addition RAW file 175 without using the signal 172 obtained from the B-areas, the difference RAW image 174, or the difference RAW file 176.

Also, in the case of the use of the image sensor shown in FIG. 11B as in the present embodiment, information combinations that are different from the present embodiment are acceptable. For example, it may be assumed that the signal 171, the addition RAW image 173, and the addition RAW file 175 are image information relating to the A-areas, and the signal 172, the difference RAW image 174, and the difference RAW file 176 are image information relating to the B-areas. Furthermore, for example, it may be assumed that the signal 171, the addition RAW image 173, and the addition RAW file 175 are image information relating to the A-areas, the signal 172 is image information relating to the B-areas, and the difference RAW image 174 and the difference RAW file 176 are image information relating to the difference image information.

The file configurations shown in FIG. 4 are applicable even when the different combinations are adopted. For example, in the case of generating a RAW file corresponding only to the A-areas, an identification code indicating that the RAW file is in the RAW format corresponding to the A-areas may be inserted into the identification code 417 indicating a RAW image in the header part 411 shown in FIG. 4B. Therefore, it is unnecessary to change the file configurations shown in FIGS. 4A to 4C regardless of which of the image sensor configurations shown in FIG. 11A and FIG. 11B is used. In addition, it does not matter whether it is the image capturing apparatus or the user operating the image capturing apparatus that determines the combination of the files to be generated and recorded.

As described above, the image capturing apparatus 100 according to the present embodiment uses the simplified development unit 111 when performing, in the still image shooting mode, the live-view display before a shooting instruction or the development processing on still image data generated in response to a shooting instruction. The simplified development unit 111 limits the image size after the development processing to two million pixels or less, or limits the denoising or the optical distortion correction to particular processing or omits the denoising or the optical distortion correction. Consequently, high-performance development processing in the case of, for example, shooting with two million pixels at the rate of 60 frames per second can be achieved with a small circuit size and a low power consumption. Meanwhile, the image capturing apparatus 100 according to the present embodiment generates a RAW file in response to a still image shooting instruction, as described above. A RAW file is a high quality file that retains the most of the image information provided from the sensor signal processing unit 103, and development processing is not required when generating this file. Therefore, the image capturing apparatus 100, with small-scale circuitry and a low power consumption, is capable of record RAW files while increasing the number of pixels in images and the speed of the continuous shooting.

Figure 5:
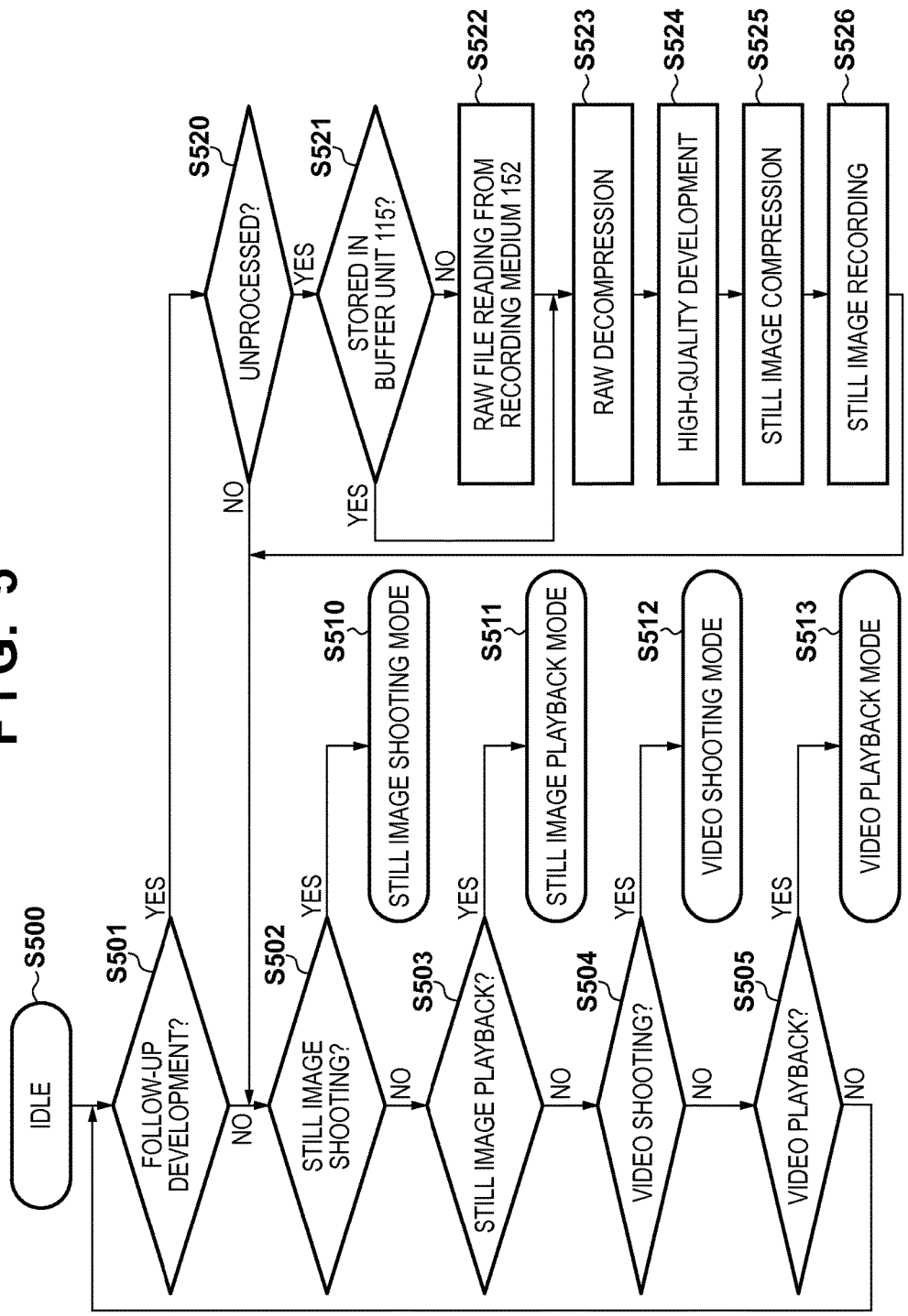
FIG. 5 is a flowchart relating to processing performed in an idle state according to the embodiment of the invention.

Next, with reference to the flowchart shown in FIG. 5, a description is given to idle state processing performed at S320 in FIG. 3. FIG. 5 shows a flowchart relating to processing performed in the idle state according to the present embodiment. The flowchart shown in FIG. 5 illustrates the processing procedure performed by the control unit 161 while controlling each processing block. A program stored in a memory (ROM) of the control unit 161 is written into a memory (RAM), and a CPU executes the program, thereby achieving the procedure.

In FIG. 5, when the idle state processing is started, the control unit 161 determines at S501 whether to perform follow-up development processing in response to a manual operation according to the setting by the user. The processing advances to S502 when it is determined not to perform the follow-up development processing, and advances to S520 when it is determined to perform the follow-up development processing.

When it is determined at S501 that the follow-up development processing is not to be performed, the control unit 161 determines, according to the mode setting input by the user, the mode to be switched to, from among the modes 201, 202, 203, and 204 shown in FIG. 2 (S502, S503, S504, and S505). Then, the control unit 161 performs control so that transition to the processing corresponding to the selected mode (S510, S511, S512, or S513) occurs.

Note that "follow-up development processing" according to the present embodiment is development processing with respect to the RAW image data held in the buffer unit 115 or the RAW image data stored in the RAW file recorded on the recording medium 152, etc., which is performed again with high quality after the completion of the shooting operation, so that a high quality display image or high-quality still image data is generated. Although both the RAW file of a still image and the RAW file of a video can be subject to the follow-up development processing according to the present embodiment, the case of a still image is taken as an example in the following description.

As described above, it is the simplified development unit 111 that performs the development processing on still image data at the time of shooting. Therefore, the number of pixels in the image is two million pixels or less, a portion of the development processing is omitted, and thus the image quality is limited. Although such a still image is useful for making a brief check of the result of shooting, it can be not suitable for checking the details of the image or for printing out. In contrast, RAW image data is high quality data that retains the most of the image information provided from the sensor signal processing unit 103. However, since RAW image data is data that has not undergone the development processing, it is difficult to display or print out the data as it is. Development processing is necessary for displaying or printing out the RAW image data, and the development processing requires certain time. Furthermore, since the format of RAW image data often varies depending on the manufacturer, the environment where RAW image data can be played back is also limited.

The follow-up development processing according to the present embodiment is an effective function in such a situation. In the present embodiment, upon the start of the follow-up development processing, RAW image data for each frame is read from the already-recorded RAW file, and undergoes the high-quality development processing performed by the high-quality development unit 112. The image data resulting from the high-quality development processing is recorded on the recording medium 152, etc. Such follow-up development processing is performed during a period in which the processing load on the apparatus is relatively low, for example during a period between shootings or when the apparatus is in the playback mode or in the sleep state and is waiting for a user operation. The follow-up development processing is not necessarily manually performed. The follow-up development processing may be designed to be automatically performed by the control unit 161.

With such a configuration, it is possible to avoid the necessity of performing development processing later every time the high quality playback is required, e.g., at the time of checking of the details, and the time of printing out. Also, the configuration allows for practical use of RAW image data in the same common environment as conventional still image files.

Returning to the description of FIG. 5, for each shooting instruction, a still image file, in which still image data obtained by development processing is stored, an addition RAW file, in which addition RAW image data is stored, and a difference RAW file, in which difference RAW image data is stored, are recorded as a set on the recording medium 152, etc. In the case where the follow-up development processing is performed manually or automatically, the control unit 161 determines, at S520, for each image set, whether the follow-up development processing has been performed or not. The determination is made by, for example, referring to the flag included in the development status 405 of the still image file 400 and indicating whether the still image data stored in the still image file is data that has undergone the processing performed by the simplified development unit 111 or not. Alternatively, the determination may be made by referring to the development status 415 in the RAW file 410 and determines whether the flag information indicating that the data has undergone the development processing performed by the high-quality development unit 112 is included therein or not. Alternatively, the determination may be performed by using a table file prepared for a series of captured still images and indicating the state of the development processing.

When it is determined by the control unit 161 that the follow-up development processing has been performed, transition to S502 occurs. When there is any still image that has not undergone the follow-up development processing, transition to S521 occurs. At S521, the control unit 161 determines whether the RAW file corresponding to a still image that has not undergone the follow-up development processing is stored in the buffer unit 115 or not. If the RAW file is buffered, the processing advances to S523, and if not, the corresponding RAW file is read from the recording medium 152, etc. at S522.

Data stored in the buffer unit 115 is updated such that a newer image captured in the still image shooting mode is preferentially held therein. In other words, the images are removed from the buffer unit 115 in the order from the oldest to the newest. With this configuration, the image that is most recently captured is always held in the buffer unit 115, and high-speed processing, in which S522 is skipped, can be realized. Furthermore, if the follow-up development processing is performed in reverse chronological order from the image that is most recently captured, the images stored in the buffer unit 115 are preferentially processed, which improves the efficiency of the processing.

At S523, the RAW decompressing unit 114 decompresses the RAW image data read from the buffer unit 115 or the recording medium 152, thereby restoring a RAW image. The RAW image data to be decompressed in this stage is the addition RAW image data alone, or two types of RAW image data, namely the addition RAW image data and the difference RAW image data.

The RAW image thus restored undergoes the high-quality development processing performed by the high-quality development unit 112 at S524, and is output to the display control unit 122 and the still image compressing unit 141 via the switch 121. The high-quality development unit 112 performs debayering (demosaicing) on the RAW image, thereby transforming the RAW image into signals including luminance signals and color difference signals, and applies, to each signal, so-called development processing, which includes denoising, optical distortion correction, image optimization, etc.

The size (the number of pixels) of the developed image generated by the high-quality development unit 112 is the same as the total size of the image read from the image sensor unit 102 or the size determined by the user, and has a significantly higher quality than the image that has undergone the simplified development processing which limits the image size to two million pixels or less. The high-quality development unit 112, which performs each sort of processing with a higher accuracy than the simplified development unit 111, can obtain a higher quality developed image, but increases the processing load. The high-quality development unit 112 according to the present embodiment is configured to avoid real-time development processing performed in parallel with shooting and take a certain time to perform the development processing, thereby reducing the circuit size and the power consumption.

Figure 12:
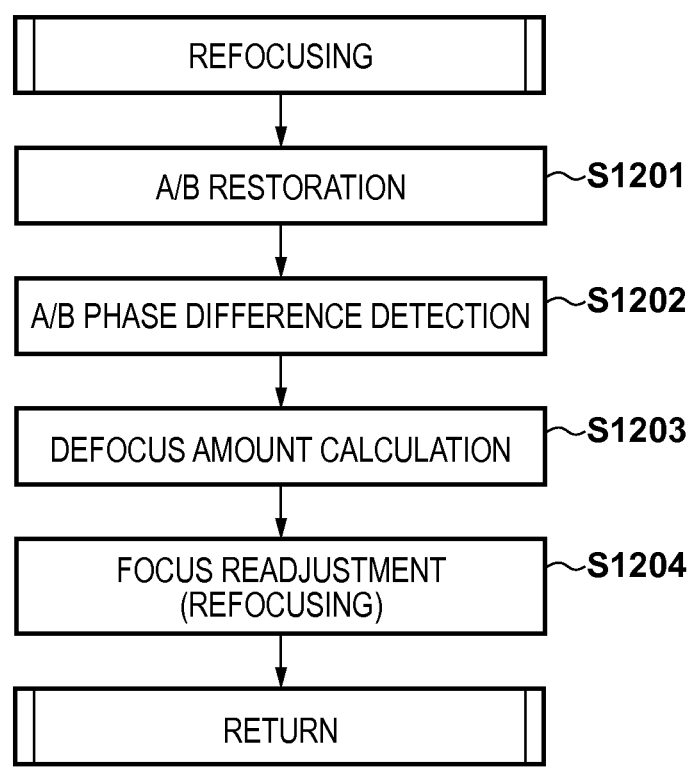
FIG. 12 is a flowchart relating to a refocus processing according to the embodiment of the invention.

Note that focus readjustment is available when the RAW decompressing unit 114 restores a difference RAW image. Also note that dynamic range adjustment can be performed by restoring a difference RAW image when the A-areas and the B-areas shown in FIG. 11B correspond to high-sensitivity pixels and low-sensitivity pixels respectively. FIG. 12 is an example of a flowchart for focus readjustment. The processing corresponding to FIG. 12 can be performed as, for example, a part of the high-quality development processing at S524. At S1201, the RAW decompressing unit 114 restores an A-image signal by adding the addition RAW image signal and the difference RAW image signal decompressed at S523 and dividing the sum by two, and restores a B-image signal by performing a subtraction with respect to the addition RAW image signal and the difference RAW image signal decompressed and dividing the difference by 2. Subsequently, at S1202, the high-quality development unit 112 detects the phase difference between the A-image signal and the B-image signal (phase difference detection processing). Furthermore, at S1203, the high-quality development unit 112 calculates the defocus amount (out-focus amount) from the phase difference thus detected, the optical characteristics of the imaging lens, the distance between the two image sensors, etc. (defocus calculation processing). At S1204, the high-quality development unit 112 corrects the decompressed addition RAW image signal based on the defocus amount thus calculated, thereby performing focus readjustment processing (refocus processing). Note that the details of the defocus amount calculation and the refocus processing are omitted here, because a known technology can be used. At S524, the high-quality development unit 112 can perform the above-described high-quality development processing with respect to the RAW image that has undergone the refocus processing performed in the above-described manner. Note that, in the description above, the refocus processing shown in FIG. 12 is performed by the high-quality development unit 112. Alternatively, however, a refocus processing unit may be additionally provided to perform the above-described processing.

The image information that has undergone the development processing performed by the high-quality development unit 112 is supplied to the still image compressing unit 141, and, at S525, the still image compressing unit 141 performs the high-efficiency encoding processing (still image compression) on the acquired image information, thereby generating a high-quality still image data. Note that the still image compressing unit 141 performs the compression processing by using a known technology such as JPEG.

Subsequently, at S526, the recording/playback unit 151 records, onto the recording medium 152, etc., the still image file storing the still image data that has undergone the high-quality development processing, and then transition to S502 occurs. Note that when there are any still images that have not undergone the follow-up development processing, the follow-up development processing can be repeatedly performed for each image.

The still image file recorded at S526 has the configuration of the still image file 400 shown in FIG. 4A, and includes the header part 401, the metadata part 402, and the compressed data part 403. The header part 401 includes, for example, an identification code indicating that this file is in the format of a still image file. The compressed data part 403 includes compressed still image data that has undergone the high-efficiency encoding.

The metadata part 402 includes file name information 404 indicating the file name of the RAW file storing the RAW image data corresponding to the still image data stored in this still image file. The metadata part 402 also includes development status information 405, which includes a flag indicating whether the still image data included in the still image file has been generated by the simplified development processing performed by the simplified development unit 111 or by the high-quality development processing performed by the high-quality development unit 112. The metadata part 402 also includes shooting metadata 406, which has been extracted from the metadata of the corresponding RAW file and which includes the evaluation values and the subject information obtained by the evaluation value calculation unit 105 and the recognition unit 131, and information about the condition of the shooting obtained from the imaging optical unit 101 and the image sensor unit 102.

The still image file including the new still image data that is obtained by the high-quality development processing and is recorded at S526 is given by the recording/playback unit 151 the same file name as the file name of the still image file including the image data obtained by the simplified development processing performed on the RAW image data of the corresponding RAW file, and performs overwriting. In other words, the still image file including the still image data obtained by the simplified development processing is deleted. Then, the recording/playback unit 151 updates the development status 415 included in the metadata part 412 of the corresponding RAW file by rewriting it with information indicating that the high-quality development process has been performed (or the follow-up development processing has been performed).

As described above, the image capturing apparatus 100 according to the present embodiment performs the follow-up development processing during a period in which the processing load on the apparatus is relatively low, for example during a period between shootings or when the apparatus is in the playback mode or in the sleep state and is waiting for a user operation. Thus, the image capturing apparatus 100 sequentially replaces the still image files each including still image data obtained by the simplified development processing performed during shooting, with the still image files each including still image data obtained by the high-quality development processing. Similarly, the image capturing apparatus 100 sequentially replaces the video files including video data obtained by the simplified development processing performed during shooting, with the video files including video data obtained by the high-quality development processing. With such a configuration, it is possible to avoid the necessity of performing development processing every time the high quality playback is required, e.g., at the time of checking of the details, and the time of printing out. Also, the configuration allows for practical use of RAW image data in the same common environment as conventional still image files.

Next, a description is given to operation of the image capturing apparatus 100 in the still image playback mode. FIG. 6 shows a flowchart relating to processing performed in the still image playback mode according to the present embodiment. The flowchart shown in FIG. 6 illustrates the processing procedure performed by the control unit 161 while controlling each processing block. A program stored in a memory (ROM) of the control unit 161 is written into a memory (RAM), and a CPU executes the program, thereby achieving the procedure.

In FIG. 6, when operation in the still image playback mode is started, the control unit 161, at S601, determines whether the processing load on the image capturing apparatus 100 is low or not. When the processing load is low, transition to the idle state occurs as indicated by S610, and otherwise the processing advances to S602. The occurrence frequency of the transition depends on the processing load. For example, during a period of waiting for a user operation such as a playback instruction, the processing advances to S610 because the processing load is low. When playback of a still image has been started according to a user operation (including the situation where playback is in progress), the processing advances to S602. At S602, the control unit 161 determines whether a user instruction to display a magnified view of the still image to be played back has been received or not. The processing advances to S603 when the instruction to display a magnified view has been received, and otherwise advances to S620.

Figure 7A:
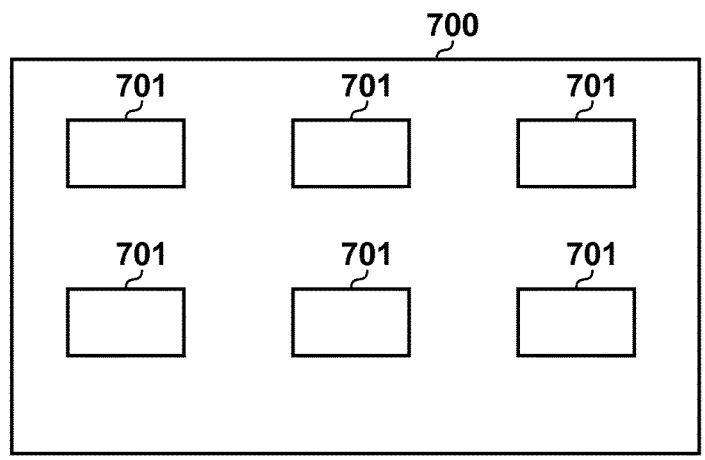
FIGS. 7A to 7C are diagrams showing examples of displaying processing in the still image playback mode according to the embodiment of the invention.
Figure 7B:
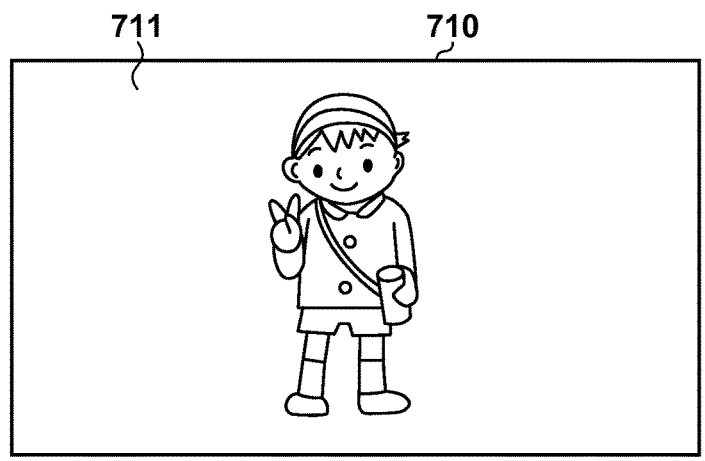
Figure 7C:
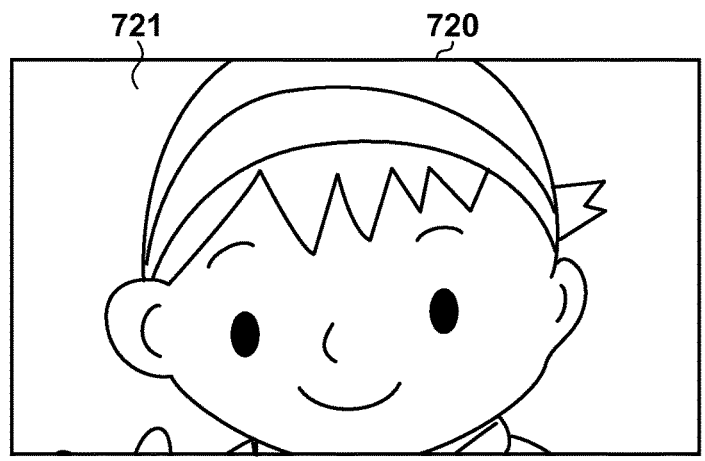

FIGS. 7A to 7C illustrate types of view including a magnified view. FIGS. 7A to 7C are diagrams showing examples of displaying processing in the still image playback mode according to the present embodiment.

The example view 700 shown in FIG. 7A is a view in which six scaled-down images indicated by the reference number 701 are displayed on the display unit 123. The example view 710 shown in FIG. 7B is a view in which a given single image 711 is entirely displayed on the display unit 123. This view state is referred to as normal view. The example view 720 shown in FIG. 7C is a view in which a magnified view 721 of a portion of a given image is displayed on the display unit 123. For example, in the case of checking the focus state immediately after a shooting, a magnified view as represented by the example view 720 is commonly used to show the details of the subject image.

In the case of displaying a magnified view as represented by the example view 720, the processing illustrated in FIG. 6 advances from S602 to S603. In the case of displaying a scaled-down view as represented by the example view 700, the processing advances from S602 to S620. In the case represented by the example view 710, the processing advances from S602 to S620 when the number of the pixels of the display unit 123 is no greater than the number of the pixels of the still image file generated by the simplified development processing (in the case of the above-described example, no greater than two million pixels), because the view to be displayed under such a condition is a same size view or a scaled-down view.

At S620, the recording/playback unit 151 reads the playback-target still image file from the recording medium 152, etc. Then, at S621, the still image decompressing unit 143 decodes and decompresses the still image data included in the still image file, and, at S608, the display control unit 122 outputs, to the display unit 123, the display image in the form of any of the views shown in FIGS. 7A to 7C.

When the number of pixels of the display image is no greater than the number of pixels of the still image data obtained by the simplified development processing (in the case of the above-described example, no greater than two million pixels), a still image having a satisfactory image quality can be displayed even if the still image data is the data that has undergone the development processing performed by the simplified development unit 111. Needless to say, the display image naturally has a satisfactory image quality if the still image data is the data that has undergone the development processing performed by the high-quality development unit 112.

On the other hand, in the case of displaying a magnified view, there is the possibility that the number of the pixels of the display image is greater than the number of the pixels of the still image data obtained by the simplified developing processing (in the case of the above-described example, no greater than two million pixels). In other words, if the image is displayed by using the still image data obtained by the simplified developing processing, the resolution perceived by the user will be degraded.

For this reason, in the case of displaying a magnified view, the control unit 161 determines, at S603, whether or not the still image data of the image to be displayed as a playback target is data that has undergone the development processing performed by the high-quality development unit 112. This determination is performed with reference to the flag included in the development status 405 stored in the metadata part 402 of the still image file 400, for example. The flag indicates whether the still image file includes still image data processed by the simplified development unit 111 or still image data processed by the high-quality development unit 112. Alternatively, the determination may be performed with reference to the development status 415 included in the RAW file 410. Alternatively, the determination may be performed by using a table file prepared for a series of captured still images and indicating the state of the development processing.

When it is determined at S603 that the still image data has undergone the high-quality development processing, the data is regarded as high-quality still image data that can maintain a satisfactory image quality even when it is magnified. Therefore, the processing advances to S620. At S620, the recording/playback unit 151 reads the corresponding high-quality still image file from the recording medium 152, etc., and plays back and displays the still image file. As described above, when the still image data is data that has undergone the high-quality development processing performed by the high-quality development unit 112, a high quality image can be displayed by the processing starting from S620. When it is determined at S603 that the still image data is not data that has undergone the high-quality development processing, this means that the still image data is data that has undergone the development processing performed by the simplified development unit 111. Accordingly, the processing advances to S604 and the high-quality development processing (the follow-up development processing described above) is performed. At S604, the control unit 161 determines whether the RAW image data corresponding to the still image data to be played back is stored in the buffer unit 115 or not. When the RAW image data is stored, the processing advances to S606. When the RAW image data is not stored, the recording/playback unit 151 reads the corresponding RAW file(s) from the recording medium 152, etc. at S605, and stores the RAW file into the buffer unit 115. The RAW file(s) read from the buffer unit 115 or the recording medium 152 in this stage is the addition RAW file alone, or two files, namely addition RAW file and the difference RAW file.

Note that data stored in the buffer unit 115 is updated such that a newer image captured in the still image shooting mode is preferentially held therein. In other words, the images are removed from the buffer unit 115 in the order from the oldest to the newest. With this configuration, the image that is most recently captured is always held in the buffer unit 115, and high-speed processing, in which S605 is skipped, can be realized.

At S606, the RAW decompressing unit 114 decodes and decompresses the RAW image data (the pair of the addition RAW image data 177 and the difference RAW image data 178, or only the addition RAW image data) read from the buffer unit 115 or the recording medium 152, etc. The decompressed RAW image data undergoes high-quality development processing performed by the high-quality development unit 112 at S607, and is output to the display control unit 122 via the switch 121. At S608, the display control unit 122 outputs, to the display unit 123, a magnified view as shown in FIG. 7C. The high-quality development unit 112 performs debayering (demosaicing) on the RAW image, thereby transforming the RAW image into signals including luminance signals and color difference signals, and applies, to each signal, so-called development processing, which includes denoising, optical distortion correction, image optimization, etc. Note that focus readjustment described above is available when the RAW decompressing unit 114 restores a difference RAW image. Also note that dynamic range adjustment can be performed by restoring a difference RAW image when the A-areas and the B-areas shown in FIG. 11B correspond to high-sensitivity pixels and low-sensitivity pixels respectively.

The size (the number of pixels) of the developed image generated by the high-quality development unit 112 is the same as the total size of the image read from the image sensor unit 102 or the size determined by the user, and has a significantly higher quality than the image that has undergone the simplified development processing which limits the image size to two million pixels or less. Therefore, the still image that has undergone the development processing performed by the high-quality development unit 112 satisfactorily fulfils the request for displaying a magnified view.

Note that the processing returns to S601 when the displaying performed at S608 is stopped. At S601, when transition to the idle state S610 occurs, the processing according to the above-described flowchart shown in FIG. 5 is performed.

As described above, it can be assumed that the high-quality development processing starting from S604 of FIG. 6 occurs at the time when the follow-up development processing has not been performed, such as immediately after a shooting. According to the present embodiment, the follow-up development processing of still images is completed step-by-step during a period in which the processing load on the apparatus is relatively low, for example during a period between shootings or when the apparatus is in the playback mode or in the sleep state and is waiting for a user operation. As a result, still image files including still image data that has undergone the simplified development processing are replaced in a natural manner with still image files including still image data that has undergone the high-quality development processing. Along with the progress of such replacement, the occurrence frequency of the high-quality development processing starting from S604 gradually decreases, and finally, it becomes possible to promptly output a high quality image in response to a request for displaying a magnified view. Thus, the operability gradually increases.

Also, as described above, in the case where the RAW image data is held in the buffer unit 115, the image can be displayed promptly, because S605 can be skipped in such a case. Considering this, in order to make it more likely that the RAW image data is held in the buffer unit 115, in the case of the example views 700 and 710 shown in FIGS. 7A and 7B, it is possible to read the RAW image data corresponding to the images 701 and the image 711 from the recording medium 152, etc. and store it in the buffer unit 115 in advance, and thereby prepare for displaying a magnified view. As the recording/playback unit 151 reads the corresponding RAW image data from the recording medium 152, etc. and stores it in the buffer unit 115 before an instruction to display a magnified view is made, a magnified view such as the example view 720 can be more promptly displayed when the instruction to display the magnified view is made.

Next, a description is given to operation of the image capturing apparatus 100 in the video shooting mode. FIG. 8 shows a flowchart relating to processing performed in the video shooting mode according to the present embodiment. The flowchart shown in FIG. 8 illustrates the processing procedure performed by the control unit 161 while controlling each processing block. A program stored in a memory (ROM) of the control unit 161 is written into a memory (RAM), and a CPU executes the program, thereby achieving the procedure.

In FIG. 8, when operation in the video shooting mode is started, the control unit 161, at S801, determines whether the processing load on the image capturing apparatus 100 is low or not. When the processing load is low, transition to the idle state occurs as indicated by S820, and otherwise the processing advances to S802. The occurrence frequency of the transition depends on the processing load. For example, when the apparatus has been set to capture a video having a large number of pixels (e.g., horizontal resolution on the order of 4000 pixels (4 k)), or a video having a high frame rate (e.g., 120 frames per second (120 P)), it is determined that the processing load is high. Accordingly, the processing always advances to S802, instead of advancing to S820. When the apparatus has been set to capture a video with a smaller number of pixels than a predetermined value or with a lower frame rate than a predetermined rate, the transition to S820 occurs between the processing of the first frame of the video and the processing of the second frame of the video, at a half the occurrence frequency, for example.

At S802, the camera control unit 104 controls the operation of the imaging optical unit 101 and the image sensor unit 102 so as to perform video shooting. For example, a lens included in the imaging optical unit 101 is moved according to a user instruction for zooming and focusing, and the reading area of the image sensor unit 102 is determined according to an instruction indicating the number of pixels used for the shooting. Also, a focus adjustment and a focus tracking with respect to a particular subject is controlled based on evaluation value information and subject information provided from the evaluation value calculation unit 105 and the recognition unit 131 as described below.

At S803, the sensor signal processing unit 103 performs signal processing on the electrical signals resulting from the transformation performed by the image sensor unit 102, in order to restore the pixel values. The processing performed here includes processing for interpolating the values of missing pixels or unreliable pixels by using the values of neighboring pixels, and processing for subtracting a predetermined offset value from the values of missing pixels or unreliable pixels. In the present embodiment, the image information output from the sensor signal processing unit 103 after the processing performed at S803 is referred to as a RAW image, which means a raw (undeveloped) video.

Note that, in the present embodiment, the sensor signal processing unit 103 outputs the addition RAW image 173 resulting from the addition of the image information obtained from the A-areas and the image information obtained from the B-areas shown in FIG. 11B. The sensor signal processing unit 103 also outputs the difference RAW image 174 resulting from the subtraction performed with respect to the image information obtained from the A-areas and the image information obtained from the B-areas. At S804, the simplified development unit 111 performs development processing on the RAW image. At this moment, the control unit 161 causes the switch 121 included in the development unit 110 to output the image information that has undergone the development processing performed by the simplified development unit 111.

The simplified development unit 111 performs debayering (demosaicing) on each of the addition RAW images constituting the frames of the video, thereby transforming the addition RAW image into signals including luminance signals and color difference signals, and applies, to each signal, so-called development processing, which includes denoising, optical distortion correction, image optimization, etc. Here, a description is given to the development processing (simplified development) for a video performed by the simplified development unit 111. The simplified development unit 111 achieves high-speed or simplified development processing by limiting the image size after the development processing to two million pixels (e.g. HD video size) or less, limiting the denoising or the optical distortion correction to particular processing, or omitting the denoising or the optical distortion correction. Since the simplified development unit 111 performs the processing after reducing the image size or partially limits the functions of the development processing, the image capturing apparatus 100 can perform, for example, a high-speed shooting of a HD size video, with a small circuit size and a low power consumption.

The image information that has undergone the development processing performed by the simplified development unit 111 is supplied to the evaluation value calculation unit 105. At S805, the evaluation value calculation unit 105 calculates evaluation values with respect to the focus state, the exposure state, etc. from luminance values and contrast values included in the image information. Note that the evaluation value calculation unit 105 may acquire the addition RAW image before the development processing and calculate evaluation values from the addition RAW image in the same manner.

The image information that has undergone the development processing performed by the simplified development unit 111 is supplied to the recognition unit 131. At S806, the recognition unit 131 detects the subject (e.g., a human face) from the image information, and recognizes the subject information. For example, the recognition unit 131 determines the presence or the absence of a human face in the image information, detects the position thereof, performs recognition of a particular human, and outputs information indicating the result.

The image information that has undergone the development processing performed by the simplified development unit 111 is supplied to the display control unit 122. At S807, the display control unit 122 forms a display image from the acquired image information, and outputs the image to the display unit 123 or an external display apparatus to display the image. The display image formed by the display unit 123 is used for checking display in the video shooting mode, by which the user can appropriately frame the subject. Specifically, as a specific usage in the case of a video shooting, the display image is used for live-view display not only during a period before the start of recording of a captured video (during a standby period), but also during recording of a video (in REC), by which the user can appropriately frame the subject. Note that the display image may be output from the display control unit 122 to another display apparatus such as an external television via the video output terminal 124. Furthermore, the display control unit 122 is also capable of, for example, displaying a mark on the focus area of the display image or displaying a frame around the recognized human face, by using the evaluation value information or the subject information provided from the evaluation value calculation unit 105 and the recognition unit 131.

At S808, the control unit 161 determines whether a video captured in response to a user instruction for starting the recording is currently being recorded (in REC) or not, and when determining that the video is currently in REC, the processing advances to S809. When it is determined at S808 that the video is not in REC (i.e., during a standby period), the processing returns to S801 and the shooting operation before the start of a video recording and the live-view display are repeatedly performed.

Within the video determined at S808 as currently being recorded, a recording-target video captured during the period from the start of the recording to the end of the recording is compressed in units of frames by the video compressing unit 142 at S809. Although not described with reference to a drawing, audio information input from a microphone (not shown in a drawing) is also acquired while a video shooting is being performed. The video compressing unit 142 also performs compression of the audio information corresponding to the video. The video compressing unit 142 performs high-efficiency encoding (video compression) on the image information and the audio information of the acquired video that has undergone the simplified development processing, thereby generating video data. Note that the video compressing unit 142 performs the compression processing by using a known video compression technology such as MPEG-2, H.264, H.265, etc. At S811, the recording/ playback unit 151 records a video file including the generated video data onto the recording medium 152.

Furthermore, according to the determination at S808 that the video is currently being recorded, a determination is made at S811 and S812 as to whether or not to record the addition RAW file and the difference RAW file. If it is determined at S811 to record the addition RAW file, the processing advances to S812 and a determination is made as to whether or not to record the difference RAW file. If it is determined to record the difference RAW file, the processing advances to S813. On the other hand, if it is determined not to record the difference RAW file, the processing advances to S815. Meanwhile, when it is determined not to record the addition RAW file, the processing advances to S817 and a determination is made as to whether or not to record the difference RAW file. If it is determined to record the difference RAW file, the processing advances to S818. If it is determined not to record the difference RAW file, i.e., if it is determined not to record the addition RAW file or the difference RAW file, the processing returns to S801.

At S813, the addition RAW images and the difference RAW images for the period corresponding to the recording-target video are supplied from the sensor signal processing unit 103 to the RAW compressing unit 113. The RAW compressing unit 113 performs high-efficiency encoding (RAW compression) on the RAW images expressing the same scene as the recording-target video, thereby transforming the RAW images to RAW image data, and generates the addition RAW file 175 and the difference RAW file 176. These RAW files are each stored in the buffer unit 115. Since the details of the RAW files thus generated are the same as those described in FIG. 3, etc., the description thereof is omitted. After the recording/playback unit 151 records the RAW files onto the recording medium 152 at S814, the processing advances to S801. Note that, at S811 and S814, the recording/playback unit 151 may transfer the video file and/or the RAW files to an external storage from the communication terminal 154 via the communication unit 153 so that the files are recorded on the external storage.

At each of S815 and S818, in the same manner as the processing performed at S813, the RAW compressing unit 113 acquires the addition RAW images or the difference RAW images that each correspond to the period corresponding to the recording-target video and that are output from the sensor signal processing unit 103. Then, the addition RAW images and the difference RAW images are respectively transformed into the addition RAW file 175 and the difference RAW file 176 by high-efficiency encoding. Subsequently, at S816 and S819, the recording/playback unit 151 records the RAW file generated in the previous step onto the recording medium 152, and then the processing advances to S801. This concludes the description of the flow of the operation performed in the video shooting mode according to the present embodiment.

Figure 9A:
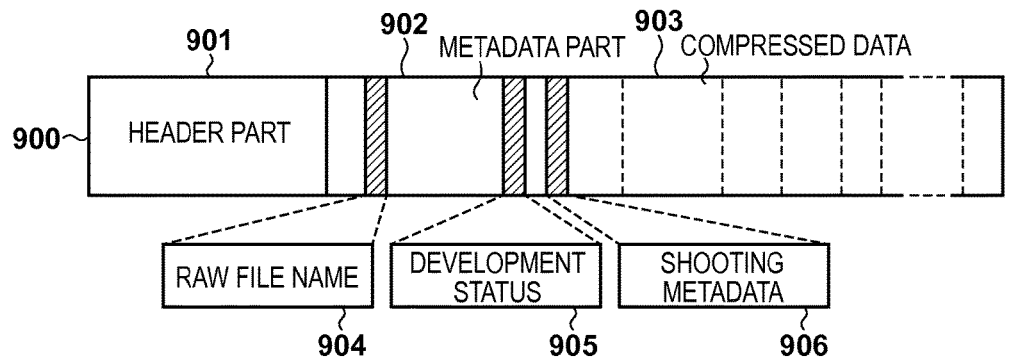
FIGS. 9A to 9C are diagrams showing examples of configurations of a video file and RAW files according to the embodiment of the invention.
Figure 9B:
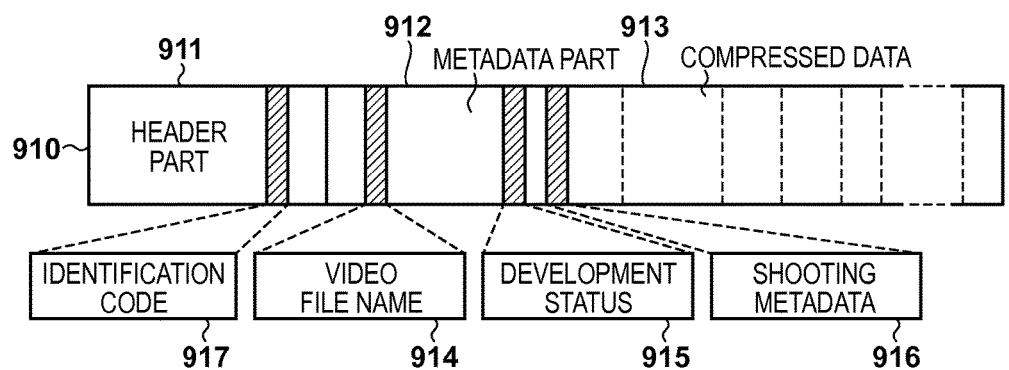
Figure 9C:
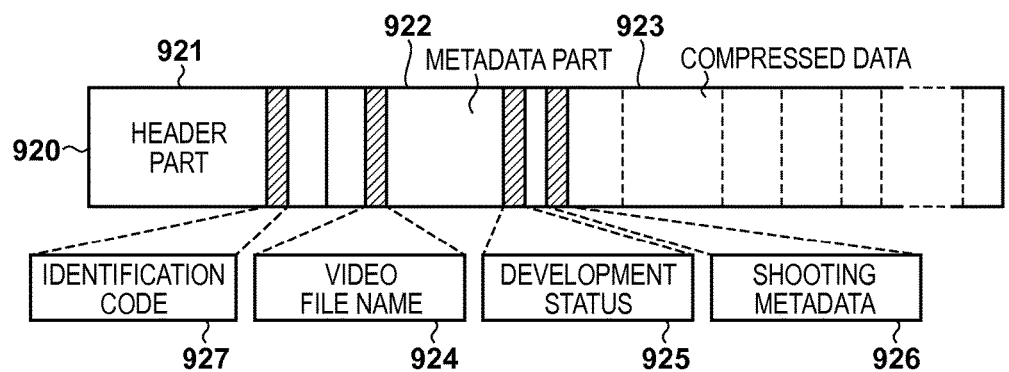

Here, a description is given to the configuration of the video file and the configurations of the RAW files according to the present embodiment. FIGS. 9A to 9C are diagrams showing an example of the configurations of a video file and RAW files.

A video file 900 shown in FIG. 9A is recorded by the recording/playback unit 151 in, for example, a predetermined recording area of the recording medium 152. The video file 900 includes a header part 901, a metadata part 902, and a compressed data part 903. The header part 901 includes, for example, an identification code indicating that this file is in the format of a video file. The compressed data part 903 includes compressed video and audio data that has undergone the high-efficiency encoding.

The metadata part 902 includes file name information 904 indicating the file name of the RAW file storing the RAW image data corresponding to the video data stored in this video file. The metadata part 902 also includes development status information 905, which includes a flag indicating whether the video data included in the video file has been generated by the simplified development processing performed by the simplified development unit 111 or by the high-quality development processing performed by the high-quality development unit 112. The metadata part 902 also includes shooting metadata 906, which includes the evaluation values and the subject information obtained by the evaluation value calculation unit 105 and the recognition unit 131, and information about the condition of the shooting (e.g., lens type identification information and sensor type identification information) obtained from the imaging optical unit 101 and the image sensor unit 102. In addition, although not shown in the drawing, the metadata part 902 may also include an identification code identifying the recording medium on which the corresponding RAW file is recorded, and path information specifying the location of the folder in which the RAW file is recorded.

The RAW file 910 shown in FIG. 9B and the RAW file 920 shown in FIG. 9C are recorded by the recording/playback unit 151 on, for example, a predetermined recording area of the recording medium 152. Each of the RAW files 910 and 920 includes a header part 911 (921), a metadata part 912 (922), and a compressed data part 913 (923). The header part 911 (921) includes, for example, an identification code 917 (927) indicating that this file is in the format of an addition RAW file or a difference RAW file. The compressed data part 913 (923) includes video RAW image data that has undergone the high-efficiency encoding (the video RAW image data may be in an uncompressed form).

The metadata part 912 (922) includes file name information 914 (924) indicating the file name of the video file including the video data generated by performing the development processing on the RAW image data included in this RAW file. The metadata part 912 (922) also includes development status information 915 (925), which includes a flag indicating whether the video data included in the video file has been generated by the simplified development processing performed by the simplified development unit 111 or by the high-quality development processing performed by the high-quality development unit 112. The metadata part 912 (922) also includes shooting metadata 916 (926), which includes the evaluation values and the subject information obtained by the evaluation value calculation unit 105 and the recognition unit 131, and information about the condition of the shooting (e.g., lens type identification information and sensor type identification information) obtained from the imaging optical unit 101 and the image sensor unit 102. In addition, although not shown in the drawing, the metadata part 912 (922) may also include an identification code identifying the recording medium on which the corresponding video file is recorded, and path information specifying the location of the folder in which the video file is recorded. Alternatively, all or part (e.g., the top frame) of the corresponding video file may be extracted and transformed into metadata and then stored in the metadata part 912 (922). The configurations of the above-described files according to the present embodiment are merely examples, and they may have a configuration conforming to a standard such as DCF, AVCHD, or MXF.

Note that, in FIG. 1 according to the present embodiment described above, the combinations of the signal 171 obtained from the A-areas and the signal 172 obtained from the B-areas, the addition RAW image 173 and the difference RAW image 174, and the addition RAW file 175 and the difference RAW file 176, are merely examples. In other words, in the case of the image sensor shown in FIG. 11A, it is possible to transmit the image information by using the signal 171 obtained from the A-areas, the addition RAW image 173, and the addition RAW file 175 without using the signal 172 obtained from the B-areas, the difference RAW image 174, or the difference RAW file 176. Also, in the case of the use of the image sensor shown in FIG. 11B as in the present embodiment, information combinations that are different from the present embodiment are acceptable. For example, it may be assumed that the signal 171, the addition RAW image 173, and the addition RAW file 175 are image information relating to the A-areas, and the signal 172, the difference RAW image 174, and the difference RAW file 176 are image information relating to the B-areas. Furthermore, for example, it may be assumed that the signal 171, the addition RAW image 173, and the addition RAW file 175 are image information relating to the A-areas, the signal 172 is image information relating to the B-areas, and the difference RAW image 174 and the difference RAW file 176 are image information relating to the difference image information.

As described above, the image capturing apparatus 100 according to the present embodiment uses the simplified development unit 111 when displaying the captured images (live-view display) in the video shooting mode or when performing development processing for the video data generated during the shooting. The simplified development unit 111, with a small circuit size and a low power consumption, can achieve development processing of, for example, a HD size video by limiting the image size after the development processing to two million pixels or less, limiting the denoising or the optical distortion correction to particular processing, or omitting the denoising or the optical distortion correction. Meanwhile, when generating a video file, the image capturing apparatus 100 according to the present embodiment also generates RAW files corresponding to the recording period of the video, as described above. A RAW file is a high quality file that retains the most of the image information provided from the sensor signal processing unit 103, and development processing is not required when generating this file. For this reason, even when the number of pixels of the video is increased to 4 k or 8 k (horizontal resolution on the order of 8000 pixels) for example, or the frame rate of the video is increased to 120 frames per second (120 P) for example, the image capturing apparatus 100 can record RAW files, with small-scale circuitry and a low power consumption.

Figure 10:
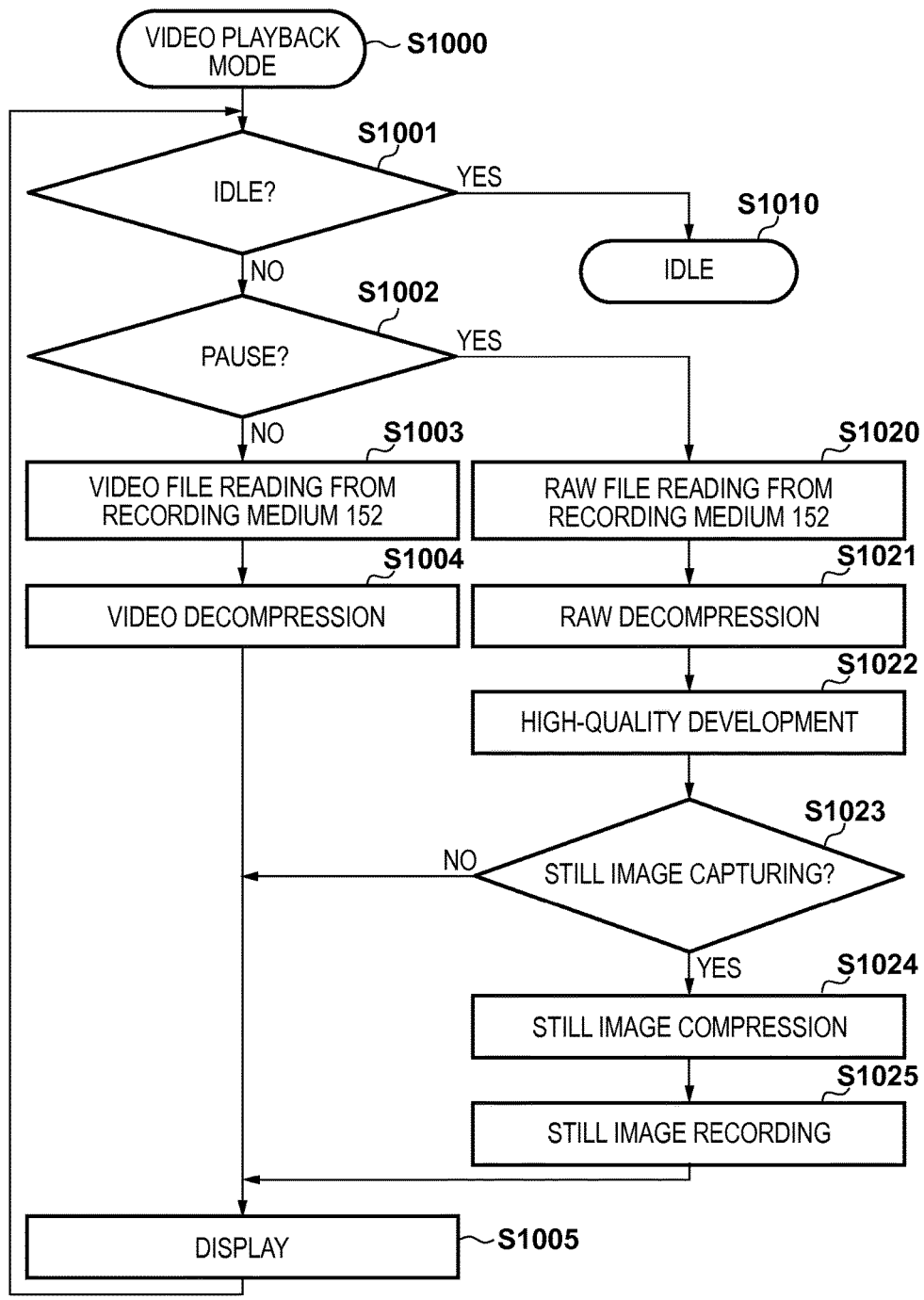
FIG. 10 is a flowchart relating to processing performed in a video playback mode according to the embodiment of the invention.

Next, a description is given to operation of the image capturing apparatus 100 in the video playback mode. FIG. 10 shows a flowchart relating to processing performed in the video playback mode according to the present embodiment. The flowchart shown in FIG. 10 illustrates the processing procedure performed by the control unit 161 while controlling each processing block. A program stored in a memory (ROM) of the control unit 161 is written into a memory (RAM), and a CPU executes the program, thereby achieving the procedure.

In FIG. 10, when operation in the video playback mode is started, the control unit 161, at S1001, determines whether the processing load on the image capturing apparatus 100 is low or not. When the processing load is low, transition to the idle state occurs as indicated by S1010, and otherwise the processing advances to S1002. The occurrence frequency of the transition depends on the processing load. For example, during a period of waiting for a user operation such as a playback instruction, the processing advances to S1010 because the processing load is low. When transition to the idle state S1010 occurs, the processing according to the above-described flowchart shown in FIG. 5 is performed. When playback of a video has been started according to a user operation (including the situation where playback is in progress), the processing advances to S1002.

At S1002, the control unit 161 determines whether a playback pause instruction has been received from the user with respect to the playback-target video. When it is determined at S1002 that no pause instruction has been received, the processing advances to S1003 in order to continue the video playback. At S1003, the recording/playback unit 151 reads the playback-target video file from the recording medium 152, etc. At S1004, the video decompressing unit 144 decodes and decompresses the video file frame by frame, and at S1005, the display control unit 122 outputs the display images of the played back video to the display unit 123. Note that the displaying at S1005 is performed for each frame. During the video playback, the processing returns to S1001 in order to display the next frame.

When it is determined at S1002 that a pause instruction has been received, the control unit 161 puts the video that is being played back and displayed into a paused state, and causes the processing to advance to S1020 in order to display, as a still image, the frame that is located at the pausing position when the pause occurs. A video in the paused state shows a still image. Therefore, further details about the image quality can be seen from a video in the paused state compared to when the video is being played back. In addition, during the pause, it can be likely that the instruction to display a magnified view is made. Considering this, in order to display a higher quality image, the recording/playback unit 151 plays back, at S1020, the RAW image data corresponding to the paused frame, which is included in the video RAW image data corresponding to the video data that is being played back. At this moment, if the playback-target RAW image data is stored in the buffer unit 115, the RAW image data is read from the buffer unit 115. On the other hand, when the playback-target RAW image data is not stored, the recording/playback unit 151 reads the RAW image data from the recording medium 152, etc., and stores the RAW image data into the buffer unit 115. The RAW image data read from the buffer unit 115 or the recording medium 152 is the addition RAW image data alone, or two types of RAW image data, namely the addition RAW image data and the difference RAW image data.

At S1021, the RAW decompressing unit 114 decodes and decompresses the addition RAW image data 177 and the difference RAW image data 178 read from the buffer unit 115 or the recording medium 152, etc., thereby restoring a RAW image. The RAW image thus restored undergoes high-quality development processing performed by the high-quality development unit 112 at S1022. The image capturing apparatus 100 corresponding to the present embodiment is also capable of generating a new, high-quality developed still image of a frame displayed during a pause of the playback-target video, from the addition RAW image corresponding to the capture image of the frame. Note that, as described in relation with S524 of FIG. 5, the focus readjustment of the addition RAW image can be performed according to the flowchart shown in FIG. 12 when the RAW decompressing unit 114 restores a difference RAW image.

Also note that dynamic range adjustment can be performed by restoring a difference RAW image when the A-areas and the B-areas shown in FIG. 11B correspond to high-sensitivity pixels and low-sensitivity pixels respectively.

Subsequently, at S1023, the control unit 161 determines whether a capture instruction from the user has been received or not. The capture instruction is an instruction to capture, as a still image, the display image at the pausing position. When it is determined at S1023 that the still image capture instruction has not been received, the high-quality still image generated by development of a RAW file of the video is supplied to the display control unit 122, and, at S1005, the display control unit 122 outputs the still image generated by high-quality development processing to the display unit 123. By this operation, the image of the playback-target video displayed during the pause is replaced with the high-quality still image generated by development of the RAW image.

On the other hand, when it is determined at S1023 that the still image capture instruction has been received, the image information that has undergone the development processing performed by the high-quality development unit 112 is supplied to the still image compressing unit 141 at S1022. At S1024, the still image compressing unit 141 performs high-efficiency encoding (still image compression) on the image information acquired by the capturing, thereby generating a still image file including high-quality still image data. Note that the still image compressing unit 141 performs the compression processing by using a known technology such as JPEG.

Subsequently, after the recording/playback unit 151 records the still image file including the high-quality still image data onto the recording medium 152, etc. at S1025, the processing advances to S1005. The high-quality still image generated by development of the RAW image data of the video is supplied to the display control unit 122, and, at S1005, the display control unit 122 outputs the still image generated by high-quality development processing to the display unit 123. By this operation, the image of the playback-target video displayed during the pause is replaced with the high-quality still image generated by development of the RAW image.

The still image file including the high-quality still image data generated by the still image compressing unit 141 at S1024 has the configuration of the still image file 400 shown in FIG. 4A. The metadata part 402 stores, as the file name information 404 of the RAW file, the file name of the RAW file of the video including the RAW image data from which the still image was captured. The metadata part 402 also stores, as the shooting metadata 406, time information of the frame captured as the still image. The time information indicates the position of the corresponding frame of the RAW file of the video. At the time of generating a still image, as a capture image of a video, from the RAW image data in the corresponding RAW file, new RAW files 410 and 420 corresponding to the still image may be generated together. The RAW files corresponding to the still image can be generated by the same method as the method described for S311 to S319 of the processing performed in the above-described still image shooting mode.

As described above, the image capturing apparatus 100 according to the present embodiment can easily play back a video without delay by using a video file recorded during a shooting, and, in the paused state, the image capturing apparatus 100 can display a replacement high-quality still image generated by development of RAW image data. Furthermore, such a high-quality still image can be easily captured as still image data.

In addition, it can be assumed that the high-quality development processing starting from S1020 of FIG. 10 occurs at the time when the follow-up development processing has not been performed, such as immediately after a shooting. According to the present embodiment, the follow-up development processing of a video is completed step-by-step during a period in which the processing load on the apparatus is relatively low, for example during a period between shootings or when the apparatus is in the playback mode or in the sleep state and is waiting for a user operation. Video files that have undergone the simplified development processing are replaced in a natural manner with video files that have undergone the high-quality development processing. Along with the progress of such replacement, the occurrence frequency of the high-quality development processing starting from S1020 decreases, and finally, it becomes possible to promptly output a high quality image any time. Thus, the operability increases more and more.

This concludes the description of the embodiments. Note that the present invention is not limited to the embodiments, and may be modified in accordance with a circuit configuration to be adopted, within the scope of the technical concept of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100962, filed May 14, 2014, which is hereby incorporated by reference herein in its entirety.

What is claimed is:

1. An image capturing apparatus comprising:
an image capturing unit configured to capture an image of a subject by using an image sensor having pixels each including a plurality of receiving elements, and to generate signals corresponding to each of the plurality of the receiving elements;
a generating unit configured to generate a first RAW image and a second RAW image from the signals;
a first development unit configured to generate first image data by performing development processing on the first RAW image;
a RAW compressing unit configured to generate first compressed-RAW image data and second compressed-RAW image data by compressing the first RAW image and the second RAW image; and
a second development unit configured to perform development processing on the first RAW image, the development processing performed by the second development unit having a higher processing load than the development processing performed by the first development unit,
wherein the second development unit generates second image data by performing development processing on the first RAW image by using the second RAW image.

2. The image capturing apparatus according to claim 1, wherein
the first RAW image includes an image generated by an addition performed with respect to the signals each generated for each of the plurality of the receiving elements, and
the second RAW image includes an image generated by a subtraction performed with respect to signals each generated for each of the plurality of the receiving elements.

3. The image capturing apparatus according to claim 1, wherein
the first RAW image includes an image generated by an addition performed with respect to signals each generated for each of the plurality of the receiving unit, and
the second RAW image includes an image generated by the signals corresponding to at least one of the plurality of receiving elements.

4. The image capturing apparatus according to claim 1, wherein
at least one of the first compressed-RAW image data and the first image data is associated with information indicating whether the second image data corresponding thereto has been generated or not, and
when the information indicates that the second image data has not been generated and the image capturing unit has not performed capturing in response to an image capture instruction, the second development unit performs development processing on the first RAW image generated by decompressing the first compressed-RAW image data.

5. The image capturing apparatus according to claim 1, further comprising
a display control unit configured to cause a display unit to display a playback image of the first image data,
wherein
at least one of the first compressed-RAW image data and the first image data is associated with information indicating whether the second image data corresponding thereto has been generated or not,
when the information indicates that the second image data has not been generated and the display unit displays the playback image in a magnified view, the second development unit performs development processing on the first RAW image, and
the display control unit causes the display unit to display, in place of the playback image, the first RAW image that has undergone the development processing performed by the second development unit.

6. The image capturing apparatus according to claim 1, wherein
the first image data is video data,
the image capturing apparatus further comprises:
a display control unit configured to cause a display unit to display a playback video of the video data; and
an operation unit configured to receive an operational instruction from a user of the image capturing apparatus,
wherein
when the operation unit receives an operational instruction for pausing when the playback video is being displayed by the display unit,
the display control unit pauses the playback video displayed by the display unit,
the second development unit performs, in response to the operational instruction for pausing, development processing on the first RAW image corresponding to the playback video displayed by the display unit, and
the display control unit further causes the display unit to display, in place of the playback video displayed in paused state, the first RAW image that has undergone development processing performed by the second development unit.

7. The image capturing apparatus according to claim 6, further comprising:
a compressing unit configured to, when the operation unit receives an image capture instruction to capture the first RAW image displayed in place of the playback video in the paused state, generate a still image file by compressing the first RAW image that has undergone the development processing; and
a recording unit configured to record the still image file on a recording medium.

8. The image capturing apparatus according to claim 1, further comprising:
a unit configured to restore RAW images corresponding to each of the plurality of receiving elements from the first RAW image and the second RAW image;
a phase difference detection unit configured to detect a phase difference from the restored RAW images; and
a defocus amount calculation unit configured to calculate a defocus amount based on the phase difference;
wherein
the second developing unit performs the development processing on the first RAW image based on the defocus amount, and
the RAW compressing unit generates the first compressed-RAW image data by compressing the first RAW image developed by the second development unit.

9. The image capturing apparatus according to claim 1, wherein the first RAW image includes an image generated by an addition performed with respect to signals each generated for each of the plurality of the receiving unit, and
the second RAW image includes an image generated by the signal corresponding to one of the plurality of receiving elements.

10. The image capturing apparatus according to claim 1, wherein the second development unit performs development processing including refocus processing.

11. The image capturing apparatus according to claim 1, wherein the signals, generated by the image capturing unit, corresponding to each of the plurality of the receiving elements have a parallax mutually.

12. The image capturing apparatus according to claim 1, wherein the first and second development units perform development processing including debayering, denoising and optical distortion correction.

13. A method for controlling an image capturing apparatus, comprising:
an image capturing step of capturing an image of a subject by using an image sensor having pixels each including a plurality of receiving elements, and generating signals corresponding to each of the plurality of the receiving elements;
a generating step of generating a first RAW image and a second RAW image from the signals;
a first development step of generating first image data by performing development processing on the first RAW image;
a RAW compressing step of generating first compressed-RAW image data and second compressed-RAW image data by compressing the first RAW image and the second RAW image; and
a second development step of performing development processing on the first RAW image, the development processing performed in the second development step having a higher processing load than the development processing performed in the first development step,
wherein, in the second development step, second image data is generated by performing development processing using the second RAW image on the first RAW image.

14. An image processing method for capturing an image of a subject by using an image sensor having pixels each including a plurality of receiving elements, and processing signals corresponding to each of the plurality of the receiving elements, comprising:
a generating step of generating a first RAW image and a second RAW image from the signals;
a first development step of generating first image data by performing development processing on the first RAW image;
a RAW compressing step of generating first compressed-RAW image data and second compressed-RAW image data by compressing the first RAW image and the second RAW image; and
a second development step of performing development processing on the first RAW image, the development processing performed in the second development step having a higher processing load than the development processing performed in the first development step,
wherein, in the second development step, second image data is generated by performing development processing using the second RAW image on the first RAW image.

15. An image processing apparatus comprising:
one or more processors; and
a memory storing instructions which, when the instructions are executed by the one or more processors, cause the image processing apparatus to function as:
an obtaining unit configured to obtain signals having a parallax mutually generated by an age capturing device;
a generating unit configured to generate a first RAW image and a second RAW image from the signals;
a first development unit configured to generate first image data by performing development processing on the first RAW image;
a RAW compressing unit configured to generate first compressed-RAW image data and second compressed-RAW image data by compressing the first RAW image and the second RAW image; and
a second development unit configured to perform development processing, the development processing performed by the second development unit having a higher processing load than the development processing performed by the first development unit,
wherein the second development unit generates second image data by performing development processing using the first RAW image and the second RAW image.

16. The image processing apparatus according to claim 15, wherein the second development unit performs development processing including refocus processing.

17. The image processing apparatus according to claim 15, wherein the second development unit performs development processing using the first RAW image generated by decompressing the first compressed-RAW image data, and the second RAW image generated by decompressing the second compressed-RAW image data.

18. The image processing apparatus according to claim 15, wherein the second development unit performs development processing during a period in which a processing load on the image processing apparatus is relatively low.

19. The image processing apparatus according to claim 15, wherein the first RAW image includes an image generated by an addition performed with respect to signals each generated for each of the plurality of the receiving unit, and
the second RAW image includes an image generated by the signal corresponding to one of the plurality of receiving elements.

20. The image processing apparatus according to claim 15, wherein the first and second development units perform development processing including debayering, denoising and optical distortion correction.

21. An image processing method for processing signals having a parallax mutually generated by an image capturing device, comprising:
a generating step of generating a first RAW image and a second RAW image from the signals;
a first development step of generating first image data by performing development processing on the first RAW image;
a RAW compressing step of generating first compressed-RAW image data and second compressed-RAW image data by compressing the first RAW image and the second RAW image; and
a second development step of performing development processing, the development processing in the second development step having a higher processing load than the development processing performed in the first development step, wherein in the second development step, second image data is generated by performing development processing using the first RAW image and the second RAW image.

* * * * *